United States Patent
Okada et al.

(10) Patent No.: US 9,904,854 B2
(45) Date of Patent: Feb. 27, 2018

(54) IMAGE PROCESSING DEVICE AND IMAGE PROCESSING METHOD

(71) Applicant: FUJITSU LIMITED, Kawasaki-shi, Kanagawa (JP)

(72) Inventors: Yasutaka Okada, Kawasaki (JP); Kimitaka Murashita, Atsugi (JP)

(73) Assignee: FUJITSU LIMITED, Kawasaki (JP)

( * ) Notice: Subject to any disclaimer, the term of this patent is extended or adjusted under 35 U.S.C. 154(b) by 48 days.

(21) Appl. No.: 15/246,651

(22) Filed: Aug. 25, 2016

(65) Prior Publication Data

US 2017/0132473 A1 May 11, 2017

(30) Foreign Application Priority Data

Nov. 9, 2015 (JP) .................. 2015-219080

(51) Int. Cl.
  G06K 9/00 (2006.01)
  G06K 9/46 (2006.01)
  G06K 9/64 (2006.01)

(52) U.S. Cl.
  CPC ....... *G06K 9/00771* (2013.01); *G06K 9/4638* (2013.01); *G06K 9/64* (2013.01)

(58) Field of Classification Search
  CPC ............ A61B 2505/03; A61B 2505/07; A61B 5/1113; A61B 5/1128; A61B 5/74; G06K 9/00771; G06K 9/4604; G06T 7/11; G06T 7/12; G06T 7/194; G06T 7/60; G08B 21/02; H04N 7/188
  See application file for complete search history.

(56) References Cited

U.S. PATENT DOCUMENTS

| | | | | |
|---|---|---|---|---|
| 9,226,696 B2 * | 1/2016 | Kiani | .............. | A61B 5/1115 |
| 9,311,540 B2 * | 4/2016 | Ecker | .............. | G06K 9/00771 |
| 2011/0301440 A1 * | 12/2011 | Riley | .............. | A61B 5/02055 600/301 |
| 2013/0100284 A1 * | 4/2013 | Fujii | .............. | A61B 5/1113 348/135 |
| 2013/0182092 A1 * | 7/2013 | Ishii | .............. | A61B 5/1113 348/77 |
| 2015/0109442 A1 * | 4/2015 | Derenne | .............. | G08B 21/245 348/143 |
| 2016/0015329 A1 * | 1/2016 | Kohlrausch | .............. | A61B 5/1113 340/573.4 |
| 2016/0171337 A1 * | 6/2016 | Okada | .............. | G06K 9/4604 382/199 |
| 2017/0046577 A1 * | 2/2017 | Rocque | .............. | A61B 5/6891 |
| 2017/0049366 A1 * | 2/2017 | Matsumoto | .............. | A61B 5/1113 |
| 2017/0055888 A1 * | 3/2017 | Matsumoto | .............. | A61B 5/1115 |

(Continued)

FOREIGN PATENT DOCUMENTS

JP 2013-078433 5/2013

*Primary Examiner* — Bhavesh Mehta
*Assistant Examiner* — Ian Lemieux
(74) *Attorney, Agent, or Firm* — Fujitsu Patent Center

(57) ABSTRACT

A computer determines a type of change in a state of a bed on the basis of a correspondence relationship between a boundary that indicates a first bed area in a first image and a line segment represented by an edge detected from a second image. The second image is an image that is captured after the first image is captured, and the change in the state of the bed is a state change that occurs during a time period from the capturing of the first image to the capturing of the second image.

15 Claims, 33 Drawing Sheets

(56) References Cited

U.S. PATENT DOCUMENTS

2017/0084025 A1* 3/2017 Lyu ...................... G06T 7/0012
2017/0135632 A1* 5/2017 Franceschetti ....... A61B 5/4836
2017/0169691 A1* 6/2017 Kirenko ............ G08B 21/0476
2017/0301097 A1* 10/2017 Okada ....................... G06T 7/11

* cited by examiner

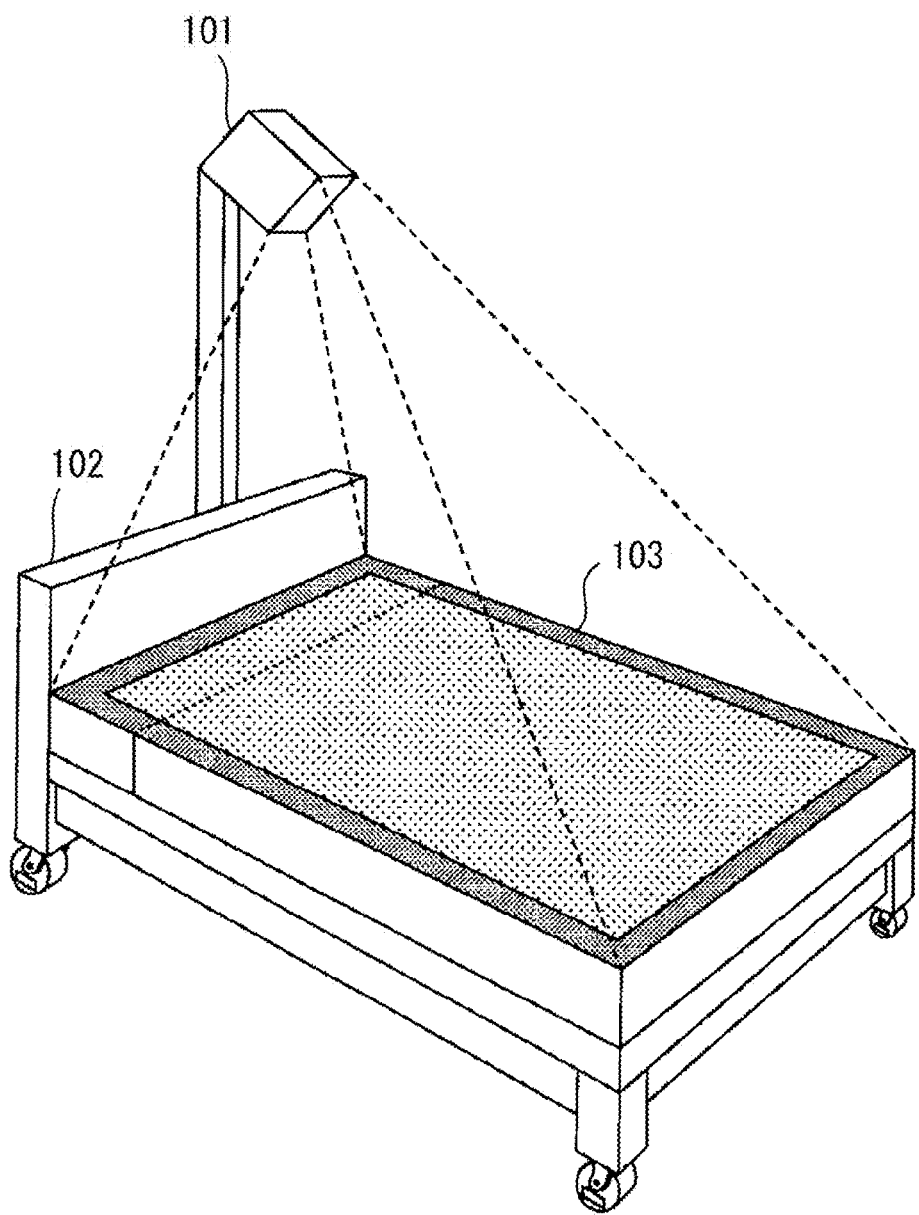
F I G. 1

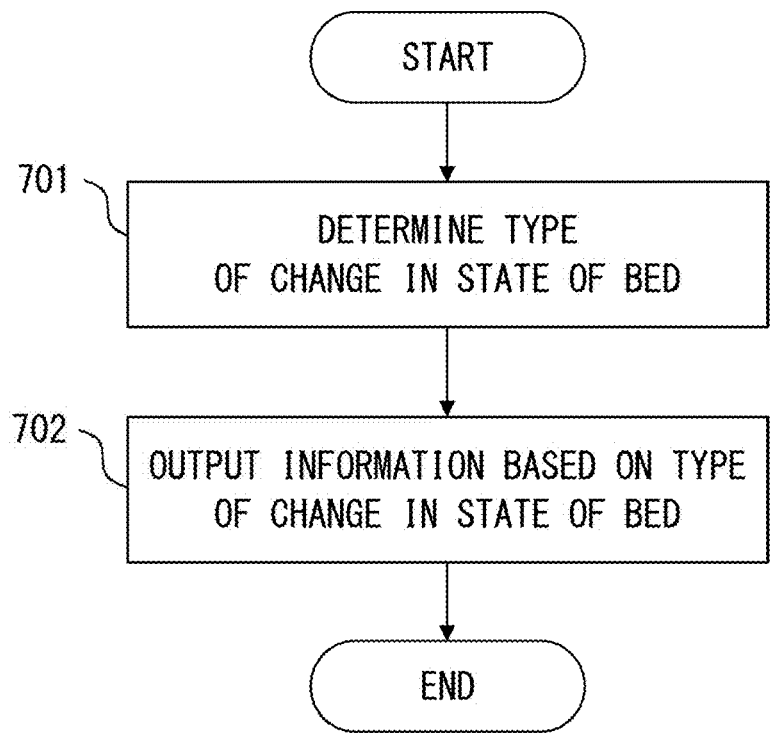
F I G. 7

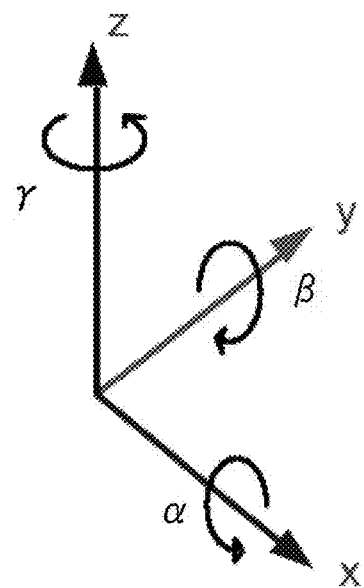
F I G. 1 3

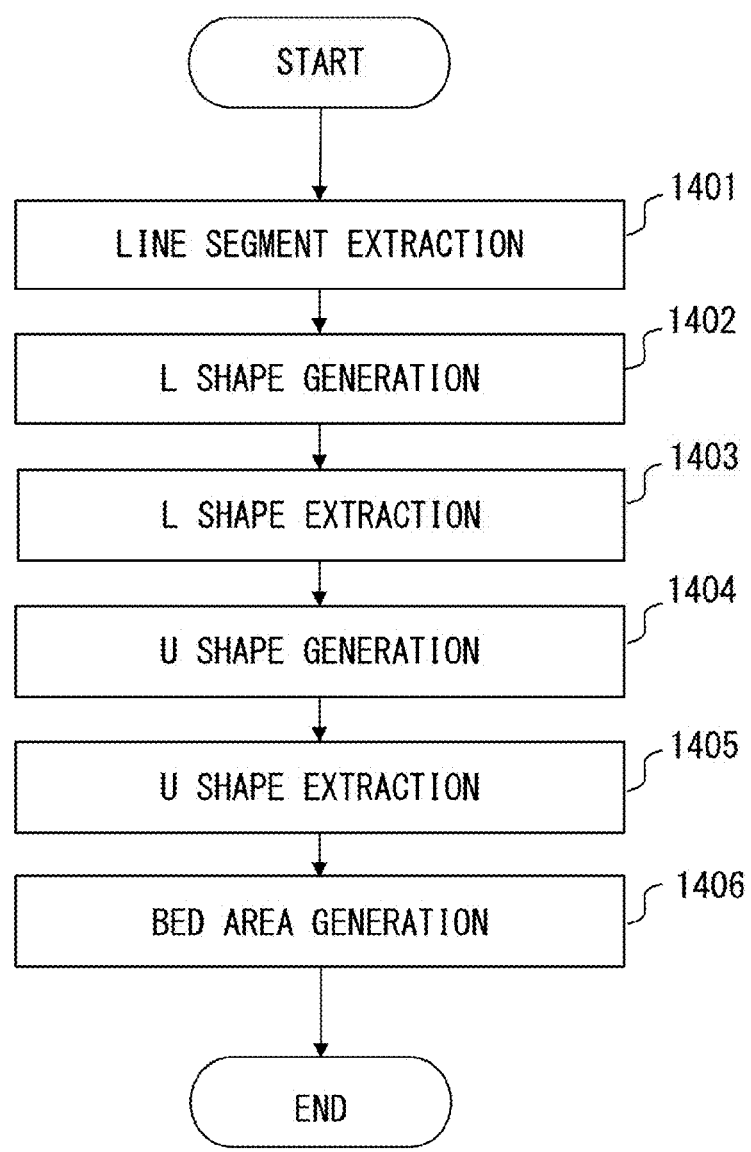
F I G. 14

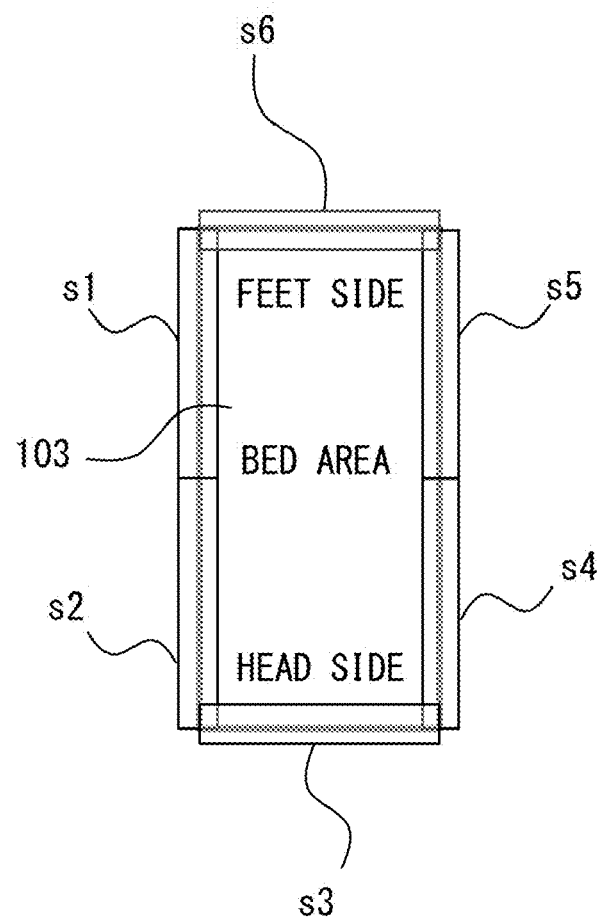
F I G. 17

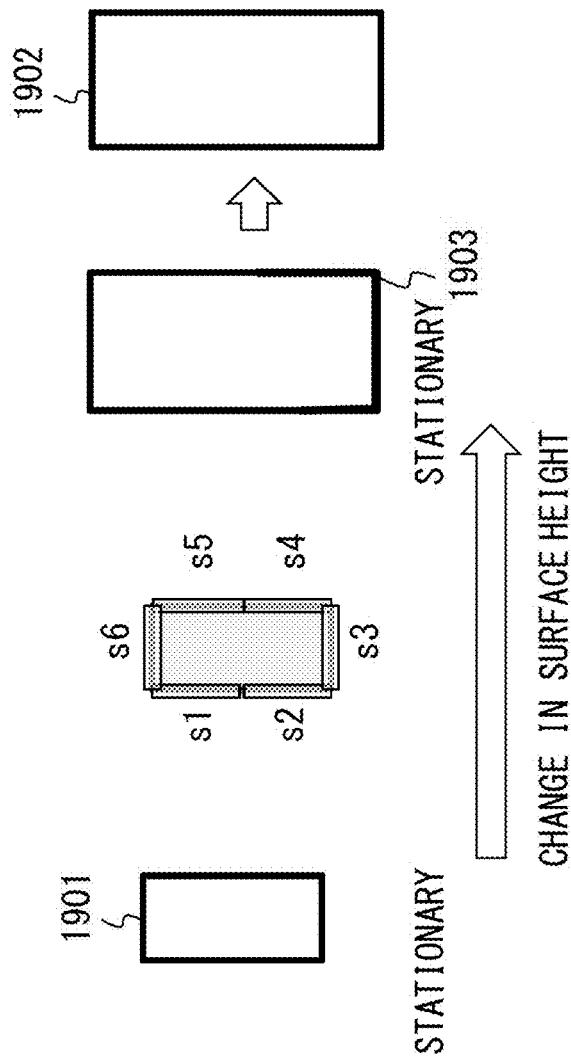
F I G. 19

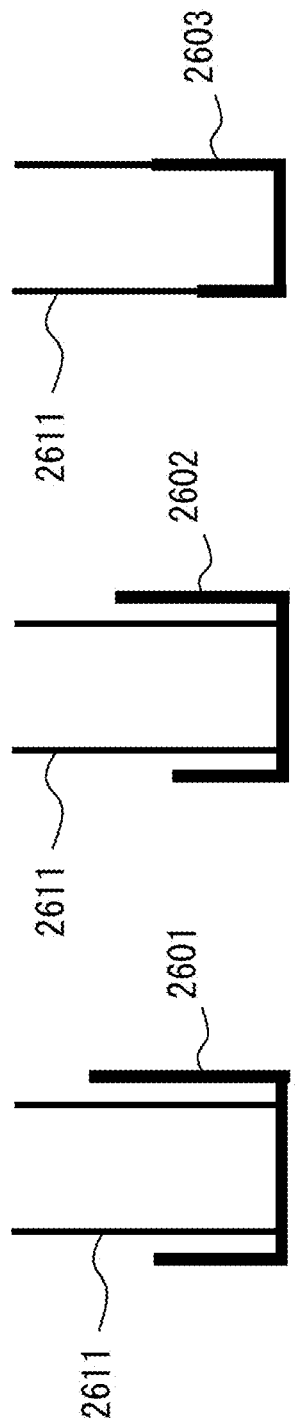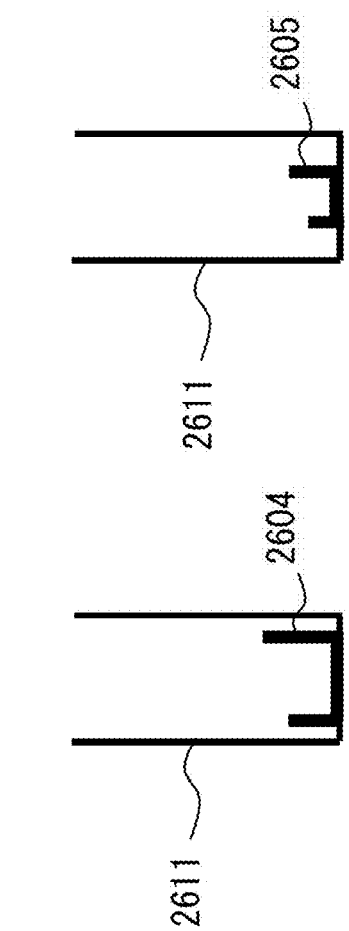

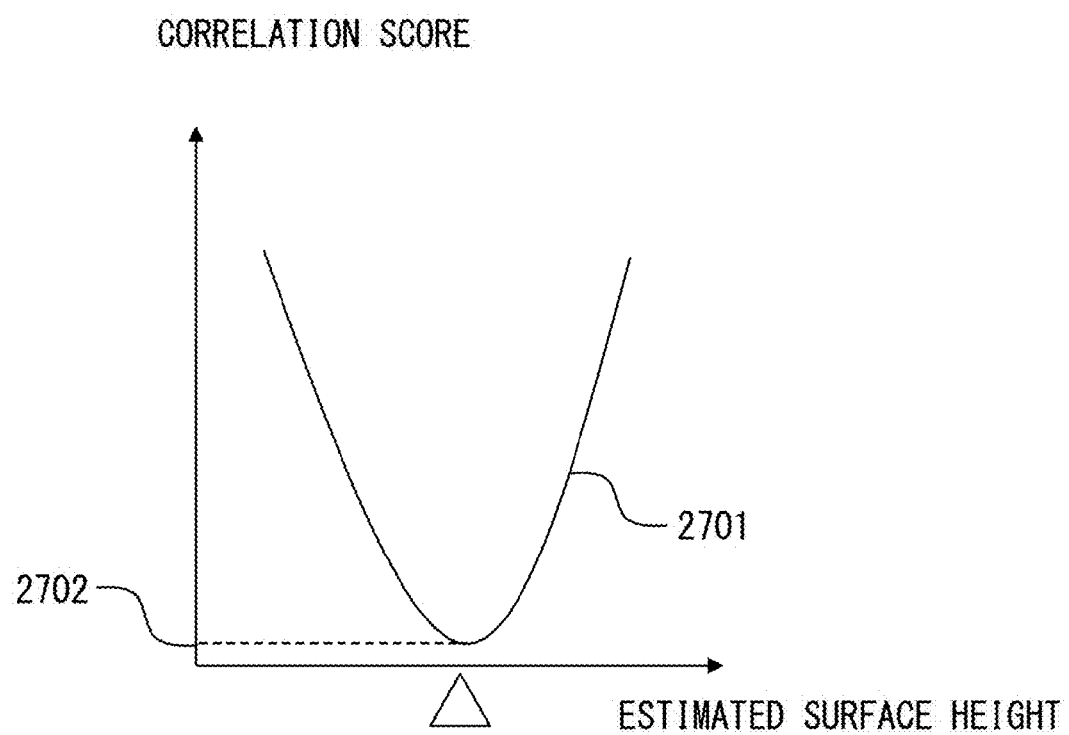
F I G. 2 7

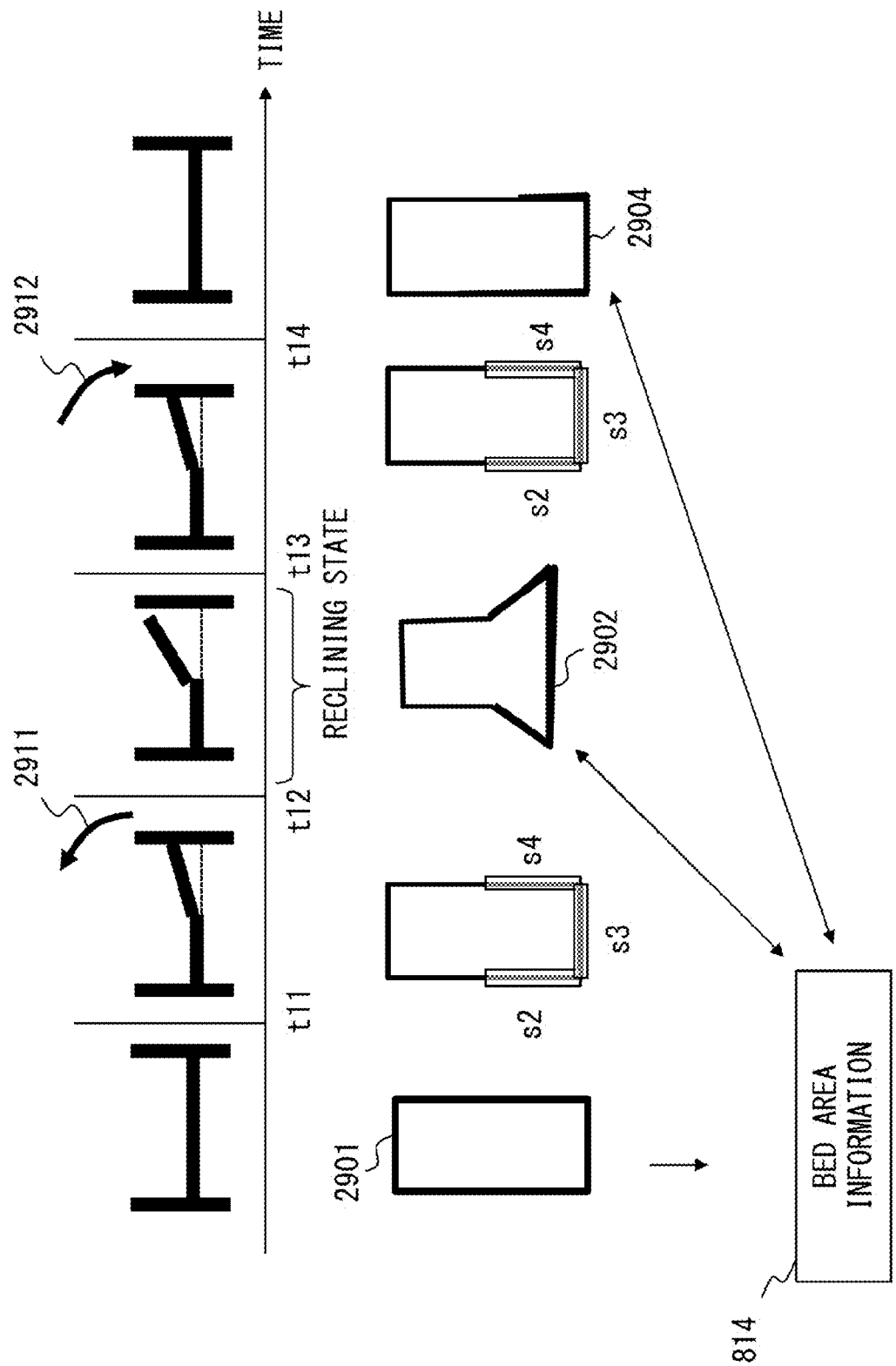
F I G. 29

IMAGE PROCESSING DEVICE AND IMAGE PROCESSING METHOD

CROSS-REFERENCE TO RELATED APPLICATION

This application is based upon and claims the benefit of priority of the prior Japanese Patent Application No. 2015-219080, filed on Nov. 9, 2015, the entire contents of which are incorporated herein by reference.

FIELD

The embodiments discussed herein are related to an image processing device and an image processing method.

BACKGROUND

A system is known that uses a camera to monitor, on behalf of a healthcare professional such as a nurse or a caregiver, the behavior of, for example, a patient or a care recipient lying on a bed upon waking up or getting out of bed, and what he/she is doing on a bed. For example, in a medical institution, when behavior upon waking up or getting out of bed that may lead to a slip or fall accident occurs, or when unusual behavior in which the patient is suffering in a state in which he/she is not able to push a nurse call button occurs, it is effective if the system reports to a nurse on behalf of the patient.

In such a system, when the behavior of a person on a bed is recognized from an image captured by a camera, information about a bed area in the image is used as a reference. A technology is also known that arranges a plurality of markers at one side of a bed so as to recognize a position of the bed and a bed area by use of a three-dimensional position of a marker that is obtained from a distance image, and by use of a known size of the bed (see, for example, Patent Document 1).

Patent Document 1: Japanese Laid-open Patent Publication No. 2013-078433

SUMMARY

According to an aspect of the embodiments, a non-transitory computer-readable recording medium stores therein an image processing program. The image processing program causes a computer to execute a process including determining a type of change in a state of a bed on the basis of a correspondence relationship between a boundary that indicates a first bed area in a first image and a line segment represented by an edge detected from a second image. The second image is an image that is captured after the first image is captured, and the change in the state of the bed is a state change that occurs during a time period from the capturing of the first image to the capturing of the second image.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1 illustrates an arrangement of a camera;
FIG. 7 is a flowchart of image processing;
FIG. 13 illustrates an orientation of the camera coordinate system with respect to the three-dimensional coordinate system;
FIG. 14 is a flowchart that illustrates a first specific example of bed area determination processing;
FIG. 17 illustrates a plurality of boundary areas;
FIG. 19 illustrates a change in the surface height;
FIGS. 26A to 26E illustrate a U shape that changes according to an estimated surface height;
FIG. 27 illustrates a change in a correlation score;
FIG. 29 illustrates the image processing due to a reclining shape change.

DESCRIPTION OF EMBODIMENTS

Embodiments will now be described in detail with reference to the drawings.

In the case of the technology of Patent Document 1, a plurality of markers are arranged on a bed, and a monitoring device is provided with a distance image sensor for generating a distance image. However, a technology that recognizes, in a simpler configuration, a state change such as a movement of a bed is unknown.

This problem occurs not only when a patient or a care recipient on a bed is monitored but also when a healthy person such as a baby on a bed is monitored.

FIG. 1 illustrates an example of an arrangement of a camera in the embodiments. A camera 101 is, for example, a monocular camera, and is installed above a bed 102 in order to capture an image of a person on the bed 102. A bed area 103 is determined from an image captured by the camera 101.

In a hospital room, there exist a patient and many objects other than the bed 102. The objects that exist in a hospital room include, for example, a futon, a pillow, an overbed table, a side table, a chair, furniture, wallpaper, and curtains. Thus, when an edge is detected from a captured image of the bed 102, a huge number of edges besides those for a shape of the bed 102 are detected.

It is conceivable that, when a line segment that represents a boundary of the bed area 103 is searched for among many line segments represented by those edges, a calculation amount is made larger and a false recognition of the bed area 103 is more likely to occur. The false recognition of the bed area 103 leads to a false recognition of a patient behavior, so there is a possibility that the burden on a nurse will be increased due to a false nurse call.

Figure 2:
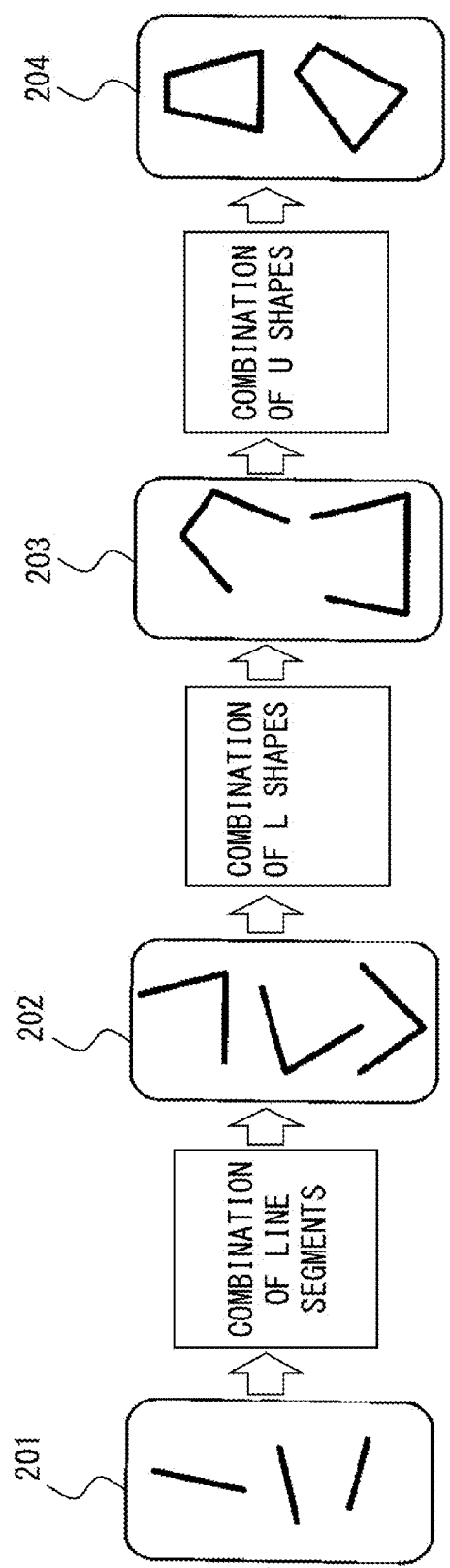
FIG. 2 illustrates a bed area extraction method.

FIG. 2 illustrates a bed area extraction method disclosed in the prior Japanese Patent Application No. 2014-250795. In this bed area extraction method, a line segment that does not form the bed area 103 is excluded from among line segments represented by edges detected from an image, so as to extract a line segment that may form the bed area 103 (Procedure 201). Next, two line segments are combined to generate an L shape, and an L shape that does not form the bed area 103 is excluded, so as to extract an L shape that may form the bed area 103 (Procedure 202).

Next, two L shapes are combined to generate a U shape, and a U shape that does not form the bed area 103 is excluded, so as to extract a U shape that may form the bed area 103 (Procedure 203). Then, two U shapes are combined to generate a rectangular shape, and a rectangular shape that does not form the bed area 103 is excluded, so as to extract a rectangular shape that represents the bed area 103 (Procedure 204). Accordingly, it is possible to determine the bed area 103 accurately and efficiently.

However, the bed 102 does not always have the same shape in the same position, and a nurse may move the bed 102 horizontally on the floor, a nurse or a patient may change the surface height of the bed 102, or the shape of the bed 102 may be changed by a reclining mechanism. A reclining shape change includes a shape change to raise a portion of the surface of the bed 102 so that a person will be able to lean against the raised portion, and a shape change to tilt back the raised portion of the surface of the bed 102 so as to return to a flat shape. If the change in a state of the bed 102 occurs after monitoring is started, there will be a change in, for example a positional relationship between the camera 101 and the bed 102, which may result in a difficulty in determining the bed area 103.

Figure 3:
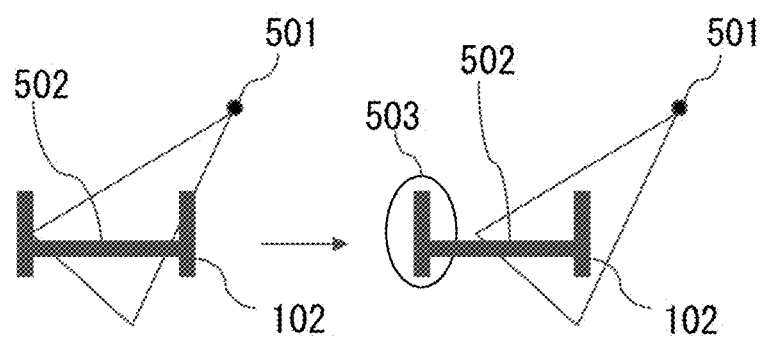
FIG. 3 illustrates a change in brightness due to a horizontal movement.

FIG. 3 illustrates an example of a change in brightness due to a horizontal movement of the bed 102. In a state in which light is radiated from a lighting fixture 501 onto a surface 502 of the bed 102, when the bed 102 is moved horizontally on the floor such that a headboard of the bed 102 moves away from the camera 101, an area 503 around a footboard gets dark. In this case, an edge is not easily detected from the boundary of the bed area 103 included in the area 503 around the footboard, and a U shape including a line segment that represents the boundary is not generated, so a rectangular shape that represents the bed area 103 is not generated.

Figure 4:
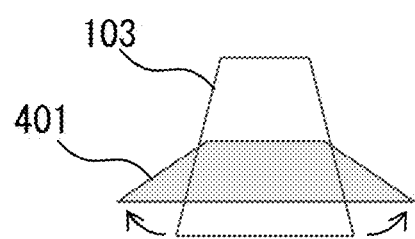
FIG. 4 illustrates a change in a line segment due to a reclining shape change.

FIG. 4 illustrates an example of a change in a line segment due to a reclining shape change of the bed 102. When a portion 401 of the surface of the bed 102 is raised due to a reclining shape change, the shape of the bed 102 is changed. In this case, a rectangular shape that represents the bed area 103 is not generated, or a generated rectangular shape does not correspond to the bed area 103.

Figure 5:
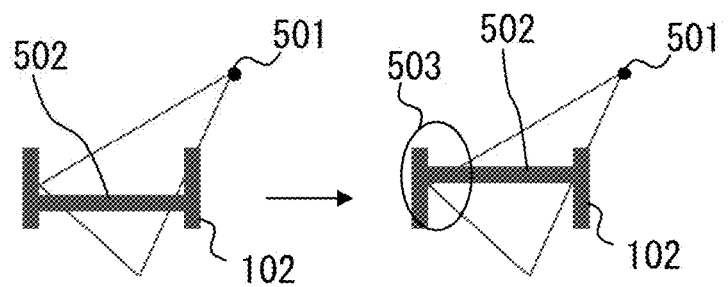
FIG. 5 illustrates a change in brightness due to a change in a surface height of a bed.

FIG. 5 illustrates an example of a change in brightness due to a change in the surface height of the bed 102. In a state in which light is radiated from the lighting fixture 501 onto the surface 502 of the bed 102, when the surface 502 is raised, the area 503 around the footboard gets dark. In this case, an edge is not easily detected from the boundary of the bed area 103 included in the area 503 around the footboard, and a U shape including a line segment that represents the boundary is not generated, so a rectangular shape that represents the bed area 103 is not generated.

Thus, it is preferable to determine the bed area 103 even when a state change such as a change in the surface height, a horizontal movement, and a reclining shape change of the bed 102 occurs.

Figure 6:
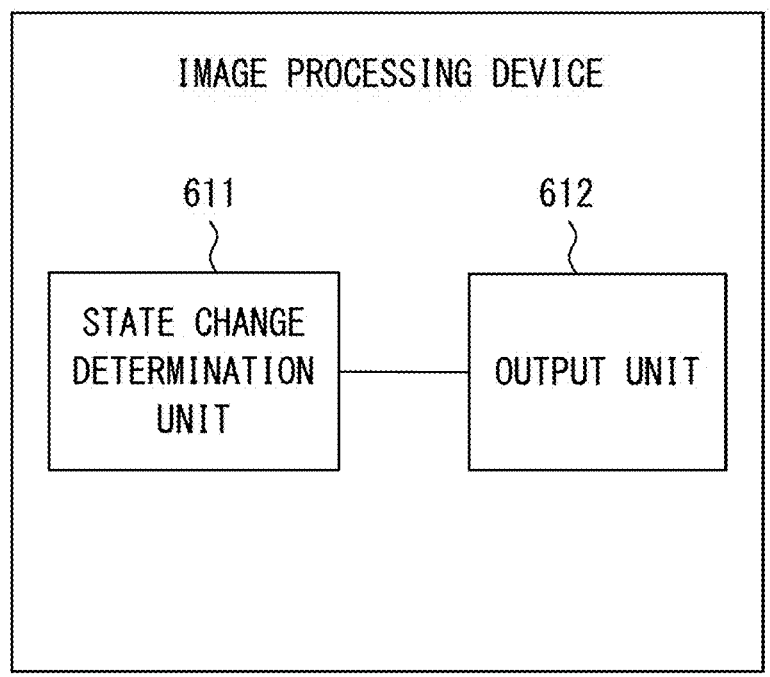
FIG. 6 illustrates a functional configuration of an image processing device.

FIG. 6 illustrates an example of a functional configuration of an image processing device of the embodiments. An image processing device 601 of FIG. 6 includes a state change determination unit 611 and an output unit 612 (an output interface).

FIG. 7 is a flowchart that illustrates an example of image processing performed by the image processing device 601 of FIG. 6. First, the state change determination unit 611 determines a type of change in a state of a bed on the basis of a correspondence relationship between a boundary that indicates a first bed area in a first image and a line segment represented by an edge detected from a second image (Step 701). The second image is an image captured after the first image is captured, and the change in a state of a bed is a state change during a time period from the capturing of the first image to the capturing of the second image.

Next, the output unit 612 outputs information based on the determined type of state change (Step 702). The information based on a type of state change may be information that indicates the type of state change, or it may be information that indicates a bed area that is updated according to the type of state change.

According to the image processing device 601, a change in a state of a bed can be easily determined from a captured image of the bed.

Figure 8:
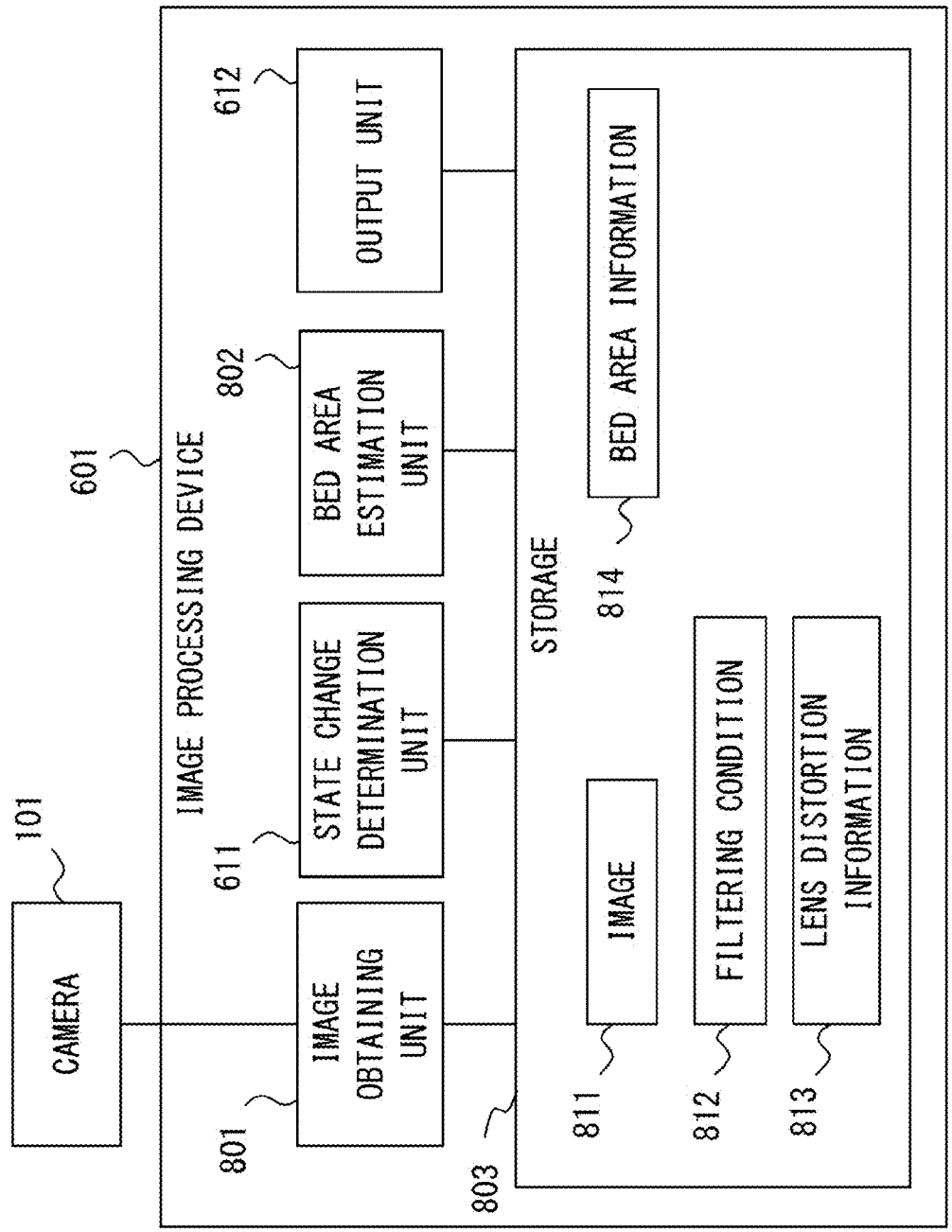
FIG. 8 illustrates a specific example of the functional configuration of the image processing device.

FIG. 8 illustrates a specific example of the image processing device 601 of FIG. 6. The image processing device 601 of FIG. 8 includes the state change determination unit 611, the output unit 612, an image obtaining unit 801, a bed area estimation unit 802, and a storage 803. The storage 803 stores an image 811, a filtering condition 812, lens distortion information 813, and bed area information 814.

The image obtaining unit 801 obtains the image 811 chronologically input from the camera 101, and stores it in the storage 803. The bed area estimation unit 802 estimates the bed area 103 from an image 811 captured at each time in a method similar to the bed area extraction method disclosed in the prior Japanese patent application described above, so as to generate the bed area information 814 that indicates the estimated bed area 103. However, the bed area estimation unit 802 estimates the bed area 103 after a line segment detected from the image 811 is converted into a line segment in three-dimensional space, which is different from the case of the prior Japanese patent application.

The state change determination unit 611 determines a type of change in a state of a bed on the basis of a correspondence relationship between a boundary that indicates the bed area 103, in three-dimensional space, which is estimated from an image 811 at a certain time, and a line segment, in three-dimensional space, that is detected from an image 811 at a time after the certain time.

Information that is similar to the filtering condition disclosed in the prior Japanese patent application is used as the filtering condition 812. The filtering condition 812 is used when the bed area 103 is estimated from the image 811, and includes, for example, a line segment extraction condition, an L shape extraction condition, and a U shape extraction condition.

The line segment extraction condition is a condition used to extract, from among line segments, in three-dimensional space, that are detected from an image, a line segment that may form the bed area 103. The line segment extraction condition may be, for example, the following condition.

(1) The angle of the line segment is included in a prescribed angular range (equal to or more than $\theta 1$ and less than $\theta 2$).

(2) The line segment exists in a stationary area.

(3) The length of the line segment is equal to or more than a prescribed length (equal to or more than L1).

A method for determining whether an area in three-dimensional space is a stationary area will be described later. The L shape extraction condition is a condition used to extract, from among L shapes each obtained by combining two line segments, an L shape that may form the bed area 103. The L shape extraction condition may be, for example, the following condition.

(4) The angle formed by two sides of the L shape (two line segments) is included in a prescribed range (equal to or more than $\theta 3$ and less than $\theta 4$).

(5) Both of the two sides of the L shape are horizontal components that form a horizontal plane.

The U shape extraction condition is a condition used to extract, from among U shapes each obtained by combining two L shapes, a U shape that may form the bed area 103. The U shape extraction condition may be, for example, the following condition.

(6) The angle formed by two sides each situated at an end of the U shape (two line segments) is included in a prescribed range (equal to or more than $\theta 5$ and less than $\theta 6$).

(7) The width between the two sides each situated at the end of the U shape is equal to or more than a prescribed length (equal to or more than L2).

(8) In an area around the two sides each situated at the end of the U shape, the brightness distribution of pixels in the image 811 varies from high brightness to low brightness.

The above extraction conditions (1) to (8) are merely examples, and the filtering condition 812 may include another line segment extraction condition, another L shape extraction condition, and another U shape extraction condition.

The lens distortion information 813 is information that indicates a lens distortion of the camera 101, and is used when a line segment detected from the image 811 is converted into a line segment in three-dimensional space. Further, the lens distortion information 813 is also used when an area, such as the bed area 103, in three-dimensional space is reverse converted into an area in the image 811.

The output unit 612 may be a display device or a communication interface. For example, when the output unit 612 is a display device, the output unit 612 can highlight, on a screen, an area that corresponds to the bed area 103 in the image 811. Further, when the output unit 612 is a communication interface, the output unit 612 can transmit the bed area information 814 to another image processing device through a communication network.

Figure 9:
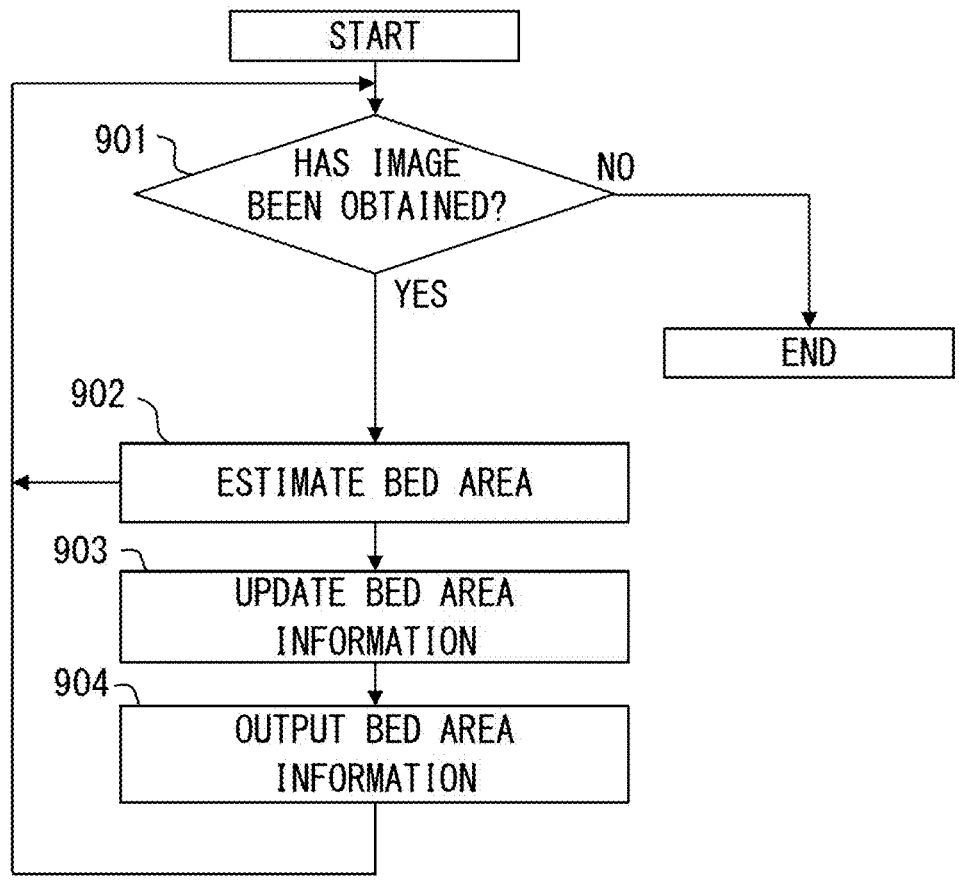
FIG. 9 is a flowchart that illustrates a specific example of the image processing.

FIG. 9 is a flowchart that illustrates a specific example of the image processing performed by the image processing device 601 of FIG. 8. First, the image obtaining unit 801 checks whether an image 811 is input from the camera 101 (Step 901), and when the image 811 is input (Step 901, YES), the image obtaining unit 801 obtains the image 811 and stores it in the storage 803.

Next, the state change determination unit 611 and the bed area estimation unit 802 perform bed area estimation processing (Step 902). Next, the bed area estimation unit 802 updates the bed area information 814 on the basis of a result of the estimation (Step 903), and the output unit 612 outputs the bed area information 814 (Step 904). Then, the image processing device 601 repeats the processes of and after Step 901 with respect to an image 811 at a subsequent time.

When a prescribed condition is satisfied in the bed area estimation processing in Step 902, the image processing device 601 skips the process of Step 902, and repeats the processes of and after Step 901. Then, when an image 811 at a subsequent time is not input (Step 901, NO), the image processing device 601 terminates the processing.

Figure 10:
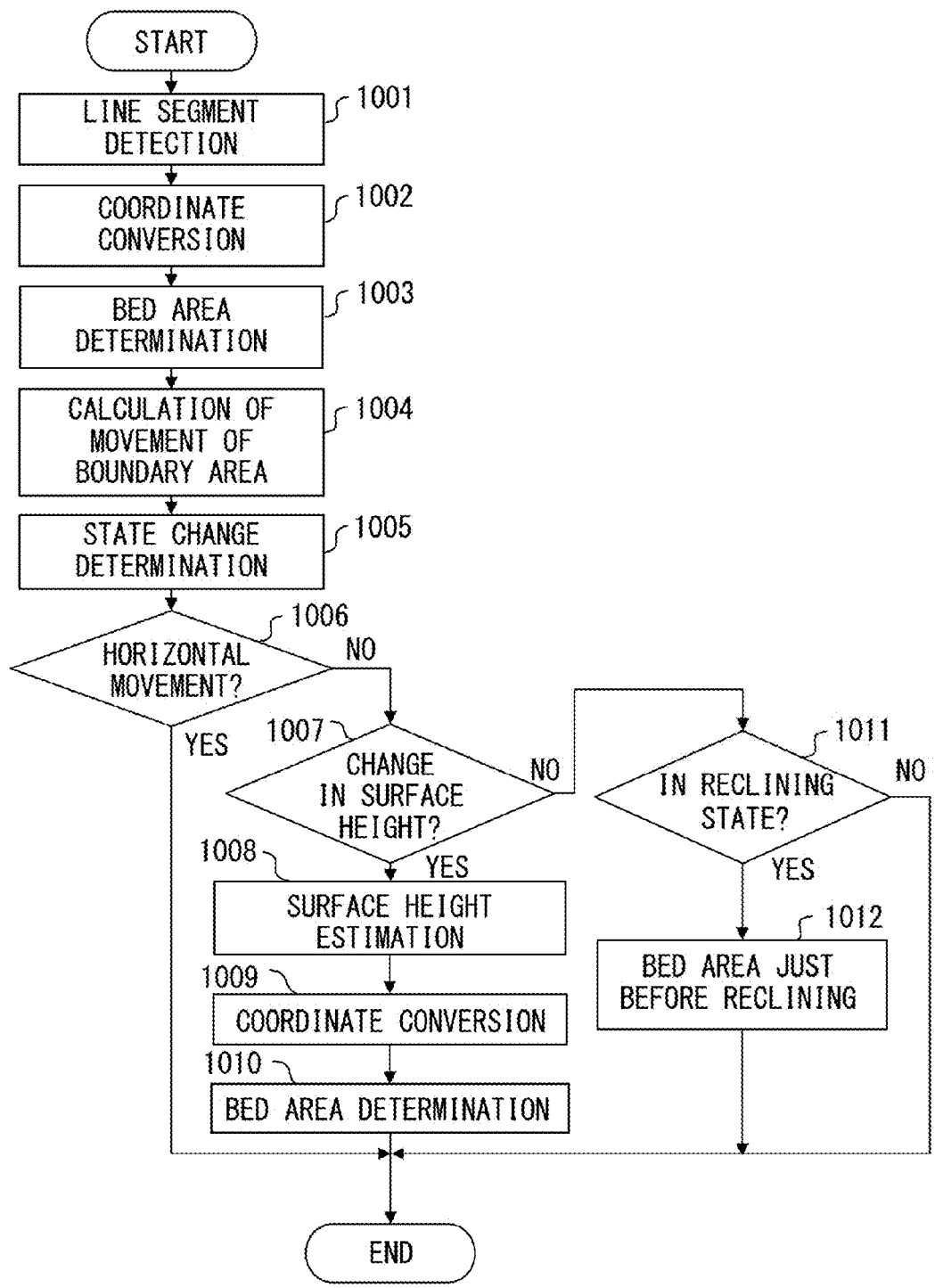
FIG. 10 is a flowchart that illustrates a first specific example of bed area estimation processing.

FIG. 10 is a flowchart that illustrates a first specific example of the bed area estimation processing in Step 902 of FIG. 9. First, the bed area estimation unit 802 detects edges from an input image 811 and generates line segments represented by the detected edges (Step 1001).

Next, the bed area estimation unit 802 converts each line segment in the input image 811 into a line segment in a three-dimensional coordinate system when looking down on the bed 102 from straight above (Step 1002). For the coordinate conversion of a line segment, a position of an origin (Xw,Yw,Zw) of a camera coordinate system in the three-dimensional coordinate system, and a roll angle $\alpha$, a pitch angle $\theta$, and a yaw angle $\gamma$ that represent an orientation of the camera coordinate system with respect to the three-dimensional coordinate system are used.

Figure 11:
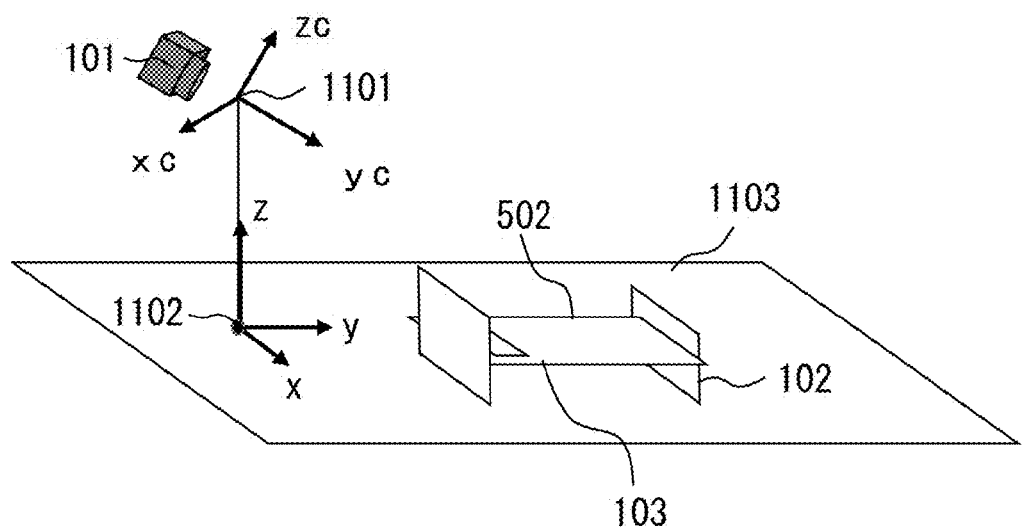
FIG. 11 illustrates a relationship between a camera coordinate system and a three-dimensional coordinate system.

FIG. 11 illustrates an example of a relationship between the camera coordinate system and the three-dimensional coordinate system. A camera coordinate system xcyczc is a coordinate system having its origin at an installation position 1101 of the camera 101, and a three-dimensional coordinate system xyz is a coordinate system having its origin at an intersection point 1102 between a perpendicular dropped straight down from the installation position 1101 onto a floor 1103 of a room and the floor 1103. In this example, an x axis of the three-dimensional coordinate system xyz is in parallel with a short side of the bed area 103, and a y axis is in parallel with a long side of the bed area 103, where Xw=Yw=0. However, when the bed 102 moves horizontally on the floor 1103, the angles of the short side and the long side of the bed area 103 with respect to the x axis and the y axis may be changed.

Figure 12:
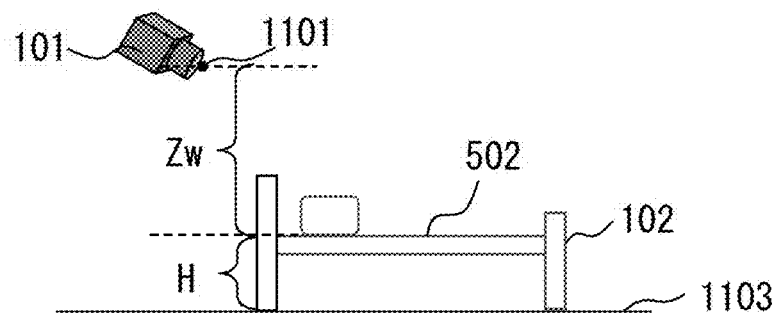
FIG. 12 illustrates an example of a relationship between an installation position of the camera and the surface height of the bed.

FIG. 12 illustrates an example of a relationship between an installation position of the camera 101 and a surface height of a bed. In this example, the origin of the three-dimensional coordinate system xyz is shifted in a z-axis direction such that the surface 502 of the bed 102 is included in an xy plane of the three-dimensional coordinate system xyz. In this case, Zw represents a difference between an installation height of the camera 101 and a surface height H of the bed 102.

FIG. 13 illustrates an example of an orientation of the camera coordinate system xcyczc with respect to the three-dimensional coordinate system xyz. The rotation about the x axis is represented by the roll angle α, the rotation about the y axis is represented by the pitch angle β, and the rotation about the z axis is represented by the yaw angle γ.

Here, it is assumed that the installation height of the camera 101, the surface height H of the bed 102, the roll angle α, and the pitch angle β are known, and the yaw angle γ is zero. When the three-dimensional coordinate system xyz of FIG. 12 is used, Xw=Yw=0, and Zw can be calculated from the installation height of the camera 101 and the surface height H of the bed 102. Accordingly, if six parameters, Xw, Yw, Zw, α, β, and γ are given, it is possible to convert coordinates of both endpoints of each line segment in the image 811 into three-dimensional coordinates in the three-dimensional coordinate system xyz. At this point, a distortion of the image 811 due to a lens distortion of the camera 101 is corrected on the basis of the lens distortion information 813.

Next, the bed area estimation unit 802 applies the filtering condition 812 to a line segment in the three-dimensional coordinate system xyz so as to determine the bed area 103 in three-dimensional space (Step 1003).

FIG. 14 is a flowchart that illustrates a first specific example of bed area determination processing in Step 1003 of FIG. 10. First, the bed area estimation unit 802 extracts, from among line segments in the three-dimensional coordinate system xyz, a line segment that satisfies the line extraction condition (Step 1401). Next, the bed area estimation unit 802 combines two line segments to generate an L shape (Step 1402), and extracts, from among generated L shapes, an L shape that satisfies the L shape extraction condition (Step 1403).

Next, the bed area estimation unit 802 combines two L shapes to generate a U shape (Step 1404), and extracts, from among generated c shapes, a U shape that satisfies the U shape extraction condition (Step 1405). Then, the bed area estimation unit 802 generates a shape that represents the bed area 103 from the extracted U shape (Step 1406). However, at this point, the bed area information 814 in the storage 803 is not updated.

Depending on a brightness of a lighting surrounding the bed 102 or a position of a person on the bed 102, there is a possibility that the boundary of the bed area 103 will not be detected. Thus, in the bed area extraction method in the prior patent application, when a line segment is not detected from one of the short sides of the bed area 103, the bed area 103 is estimated on the basis of the information about the width of a U shape and the aspect ratio of the bed 102.

In this case, the bed area 103 in the image 811 is estimated, so the direction of the long side of the bed area 103 varies depending on the relative positional relationship between the bed 102 and the camera 101. Thus, with respect to a plurality of positions of the bed 102 in the image 811, the correspondence relationship between the position of the bed 102 and the direction of the long side of the bed area 103 is preferably stored in a storage device in advance.

On the other hand, in the bed area determination processing of FIG. 14, the bed area 103 in the three-dimensional coordinate system xyz is estimated, so the direction of the long side of the bed area 103 remains unchanged independently of the relative positional relationship between the bed 102 and the camera 101. Thus, the correspondence relationship between the position of the bed 102 and the direction of the long side of the bed area 103 does not have to be stored, which results in reducing a capacity of the storage device.

Figure 15:
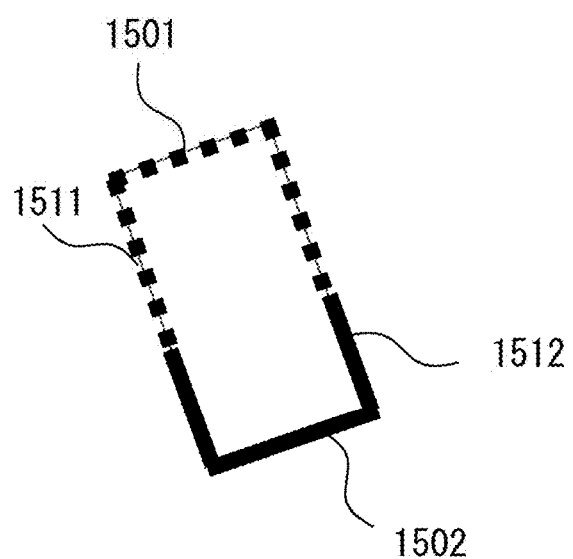
FIG. 15 illustrates a relationship between the shape of the bed area and a U shape.

FIG. 15 illustrates an example of a relationship between the shape of the bed area 103 and a U shape. In the three-dimensional coordinate system xyz, the shape and the size of the bed 102 remain unchanged independently of the position and the direction of the bed 102. In consideration of this point, even when a line segment is not detected from one of the short lines 1501 of the bed area 103, the shape of the entirety of the bed area 103 can be generated if a U shape 1511 is interpolated on the basis of another-side U shape 1512 generated from another short line 1502.

Figure 16:
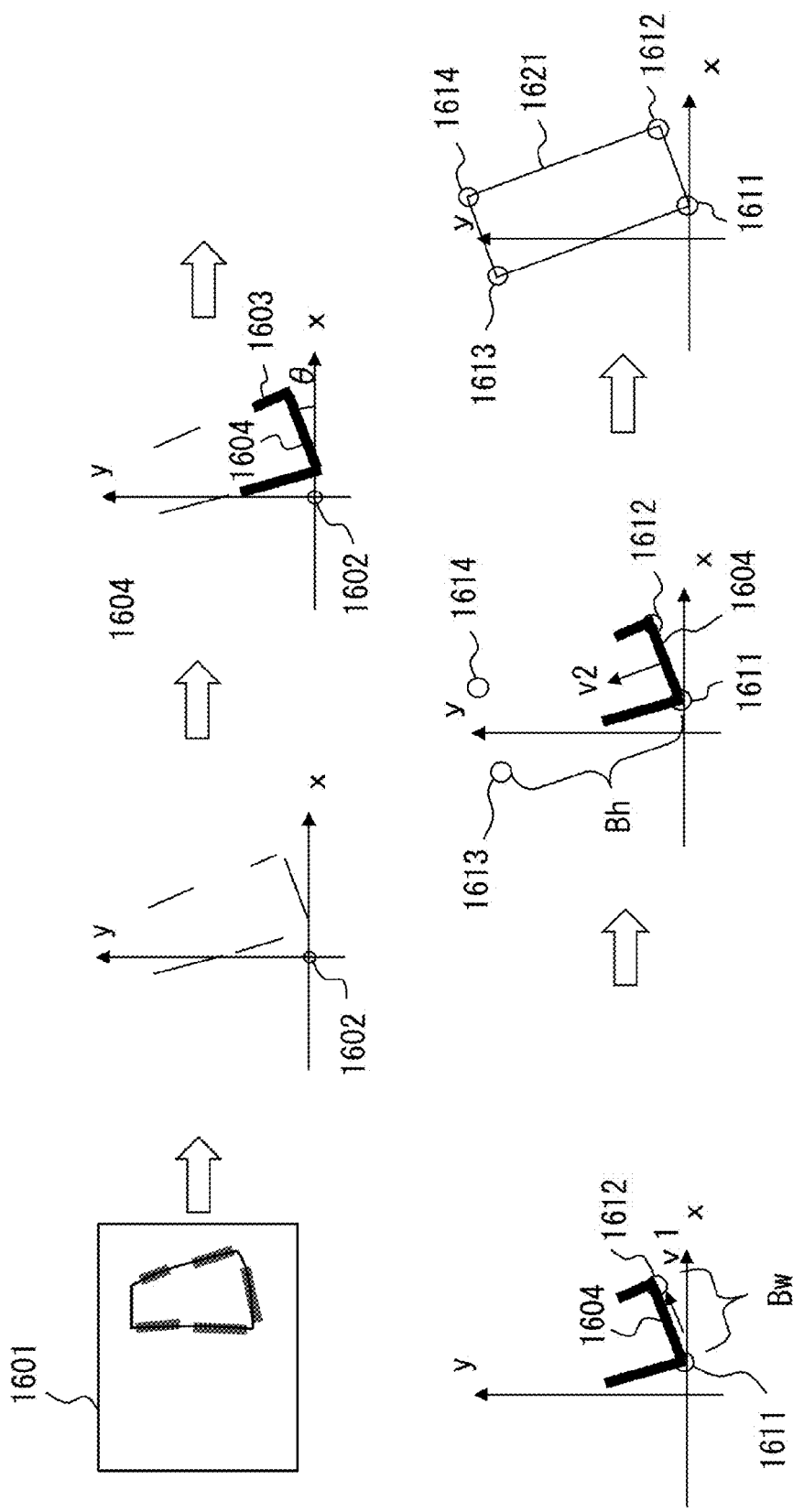
FIG. 16 illustrates bed area generation processing.

FIG. 16 illustrates an example of bed area generation processing above. The bed area estimation unit 802 converts each line segment in an image 1601 input from the camera 101 into a line segment in the three-dimensional coordinate system xyz. An origin 1602 of the three-dimensional coordinate system xyz corresponds to the installation position 1101 of the camera 101. Then, the bed area estimation unit 802 generates, from among line segments included in the xy plane, a U shape 1603 that satisfies the U shape extraction condition.

In this example, a base 1604 of the U shape 1603 corresponds to the short side of the bed area 103, and has a slope forming an angle θ with the x axis. The angle θ represents a relative angle between an optical-axis direction of the camera 101 and the long side of the bed area 103, and is not dependent on the parameter Zw of a coordinate conversion.

Next, the bed area estimation unit 802 obtains a unit direction vector v1 directed from one endpoint to another endpoint using coordinates of both endpoints of the base 1604 in the xy plane. Then, the bed area estimation unit 802 obtains a coordinate pFL of an apex 1611 and a coordinate pFR of an apex 1612 of the bed area 103 using a coordinate m of the midpoint of the base 1604, the unit direction vector v1, and a length Bw of the short side of the bed area 103 (a bed width), by use of the following formulas.

$$pFL = m - v1 \cdot Bw/2 \quad (1)$$

$$pFR = m + v1 \cdot Bw/2 \quad (2)$$

The coordinate pFL of Formula (1) represents a position of a point that moves, starting at the midpoint of the base 1604, in a direction opposite to that of the unit direction vector v1 by half the bed width Bw. The coordinate pFR of Formula (2) represents a position of a point that moves, starting at the midpoint of the base 1604, in a direction of the unit direction vector v1 by half the bed width Bw.

Next, the bed area estimation unit 802 obtains a unit normal vector v2 of the base 1604. Then, the bed area estimation unit 802 obtains a coordinate pBL of an apex 1613 and a coordinate pBR of an apex 1614 of the bed area 103 using the unit normal vector v2 and a length Bh of the long side of the bed area 103, by use of the following formulas.

$$pBL = pFL + v2 \cdot Bh \quad (3)$$

$$pBR = pFR + v2 \cdot Bh \quad (4)$$

The coordinate pBL of Formula (3) represents a position of a point that moves, starting at the apex 1611, in a direction of the unit direction vector v2 by the length Bh, and coordinate pBR of Formula (4) represents a position of a point that moves, starting at the apex 1612, in the direction of the unit direction vector v2 by the length Bh. The bed area estimation unit 802 generates, as a shape that represents the bed area 103, a rectangle 1621 represented by line segments that connect the apexes 1611 to 1614.

After the bed area 103 is determined by the bed area estimation unit 802, the state change determination unit 611 calculates the movements of a plurality of boundary areas corresponding to a plurality of boundaries that indicate the determined bed area 103 (Step 1004).

FIG. 17 illustrates an example in which there exist a plurality of boundary areas. In this example, six boundary areas are arranged on the boundary of the determined bed area 103. Each boundary area has an elongated rectangular shape of a prescribed width, which includes the boundary as a center line.

A boundary area s3 corresponds to a short side at a side of the headboard of the bed area 103 (at a side of the head of a person), and a boundary area s6 corresponds to a short side at a side opposite to the headboard (at a side of the feet of a person). A boundary area s2 corresponds to a portion of the head side of one long side of the bed area 103, and a boundary area s1 corresponds to a portion of the feet side of the one long side. A boundary area s4 corresponds to a portion of the head side of another long side of the bed area 103, and a boundary area s5 corresponds to a portion of the feet side of the another long side.

From among these boundary areas, the boundary areas s2 to s4 correspond to a reclining portion of the bed 102. The reclining portion is a portion that is raised and tilted back due to a reclining shape change. On the other hand, the boundary areas s1, s5, and s6 correspond to a portion in which a state change does not occur due to a reclining shape change.

The movement of a boundary area at a time t can be calculated using pixel values in the image 811 at three different times, for example, a time (t−2), a time (t−1), and the time t. At this point, the state change determination unit 611 reverse converts a range of each boundary area in the three-dimensional coordinate system xyz into a range in the image 811, so as to determine pixels that belong to each boundary area. When a pixel value of a pixel (x,y), at the time t, that belongs to a certain boundary area is $f_t(x,y)$, a difference f1(x,y) in pixel value between the time t and the time (t−1) is obtained using the following formula.

$$f1(x,y)=|f_t(x,y)-f_{t-1}(x,y)| \quad (11)$$

Likewise, a difference f2(x,y) in pixel value between the time (t−1) and the time (t−2) is obtained using the following formula.

$$f2(x,y)=|f_{t-1}(x,y)-f_{t-2}(x,y)| \quad (12)$$

Then, the state change determination unit 611 binarizes f1(x,y) and f2(x,y) using a prescribed threshold TH, by use of the following formulas.

$$b1(x,y)=1(f1(x,y)\geq TH) \quad (13)$$

$$b1(x,y)=0(f1(x,y)<TH) \quad (14)$$

$$b2(x,y)=1(f2(x,y)\geq TH) \quad (15)$$

$$b2(x,y)=0(f2(x,y)<TH) \quad (16)$$

Next, the state change determination unit 611 obtains b3(x,y) that is a logical product of b1(x,y) and b2(x,y) using the following formula.

$$b3(x,y)=b1(x,y) \text{ and } b2(x,y) \quad (17)$$

Next, the state change determination unit 611 obtains a proportion of pixels in which the logical product b3(x,y) is "1" to all pixels that belong to one boundary area, and when the obtained proportion is greater than a prescribed value, the state change determination unit 611 determines that the boundary area is a moving area. On the other hand, when the obtained proportion is not greater than the prescribed value, the state change determination unit 611 determines that the boundary area is a stationary area. Then, the state change determination unit 611 performs state change determination processing (Step 1005).

Figure 18:
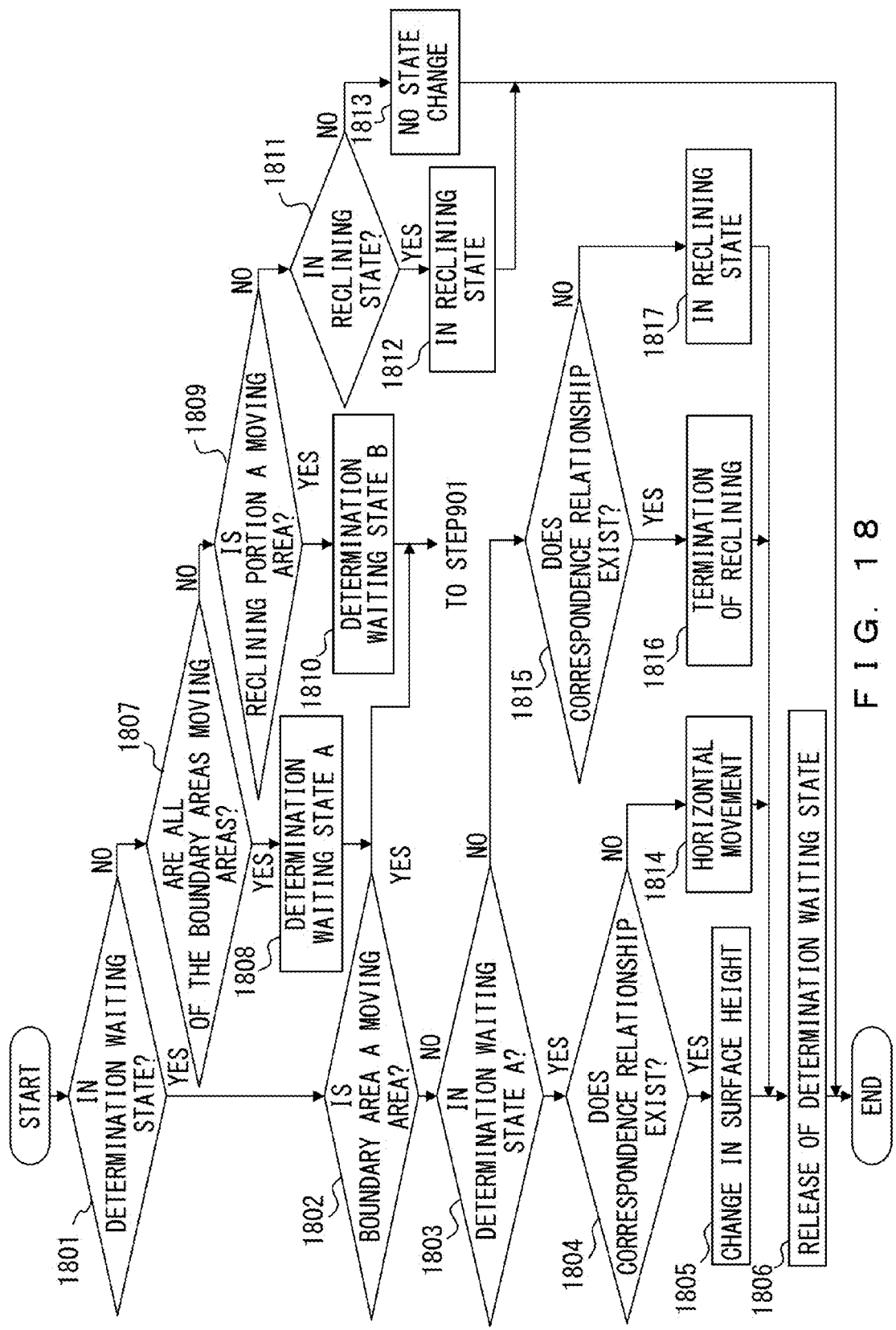
FIG. 18 is a flowchart that illustrates a first specific example of state change determination processing.

FIG. 18 is a flowchart that illustrates an example of the state change determination processing in Step 1005 of FIG. 10. It is conceivable that two or more state changes from among a change in the surface height, a horizontal movement, and a reclining shape change of the bed 102 will not occur at the same time but that only one of the state changes will occur. Thus, in the state change determination processing, it is determined, on the basis of a combination of moving boundary areas, that the change in the state of the bed 102 corresponds to one of a change in the surface height, a horizontal movement and a reclining shape change.

FIG. 19 illustrates an example of a change in the surface height. In this example, the surface height of the bed 102 is raised. A rectangle 1901 represents the bed area 103 before a change in the state of the bed 102, and a rectangle 1902 represents the bed area 103 generated from a U shape 1903 after the state change. In this case, the U shape 1903 and the rectangle 1902 are represented using the three-dimensional coordinate system xyz before the state change. The parameter Zw of a coordinate conversion is expected to be decreased if the surface height is raised, and a coordinate conversion is performed using Zw before the state change as long as a change in the surface height is not detected.

When the surface height is raised, all of the boundary areas s1 to s6 become moving areas, and the rectangle 1902 is made larger than the rectangle 1901. The rectangle 1901 and the rectangle 1902 have the same center position and the same slope, so if the rectangle 1902 is reduced in size, it becomes coterminous with the rectangle 1901. Conversely, when the surface height is lowered, a rectangle generated from a U shape after the state change is made smaller than the rectangle 1901, so if the rectangle after the state change is enlarged, it becomes coterminous with the rectangle 1901.

Thus, if the bed areas 103 before and after the state change are compared while changing the surface height H of the bed 102 to change Zw, it is possible to determine whether the surface height has been changed.

Figure 20:
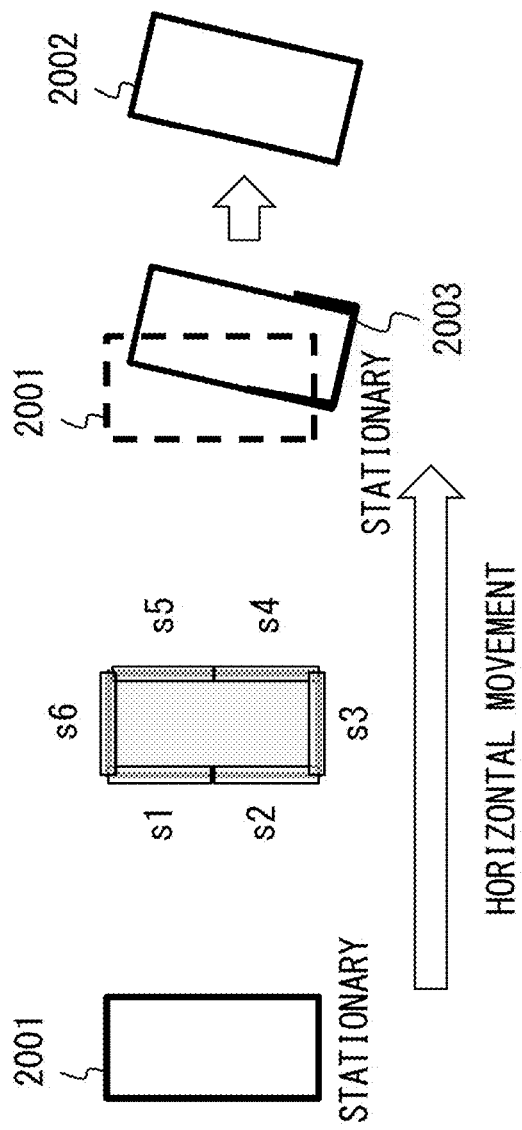
FIG. 20 illustrates a horizontal movement.

FIG. 20 illustrates an example of a horizontal movement. A rectangle 2001 represents the bed area 103 before a change in the state of the bed 102, and a rectangle 2002 represents the bed area 103 generated from a U shape 2003 after the state change. In this case, the surface height is not changed due to the change in the state of the bed 102, so Zw is not changed, and the three-dimensional coordinate system xyz is also not changed.

When the bed 102 moves horizontally, all of the boundary areas s1 to s6 become moving areas. The rectangle 2001 and the rectangle 2002 have the same size but are in different positions and have different slopes, so even if the rectangle 2002 is enlarged or reduced in size, it does not become coterminous with the rectangle 2001. Thus, if the bed areas 103 before and after the state change are compared while changing the surface height H of the bed 102 to change Zw, it is possible to determine whether the horizontal movement has been performed.

Figure 21:
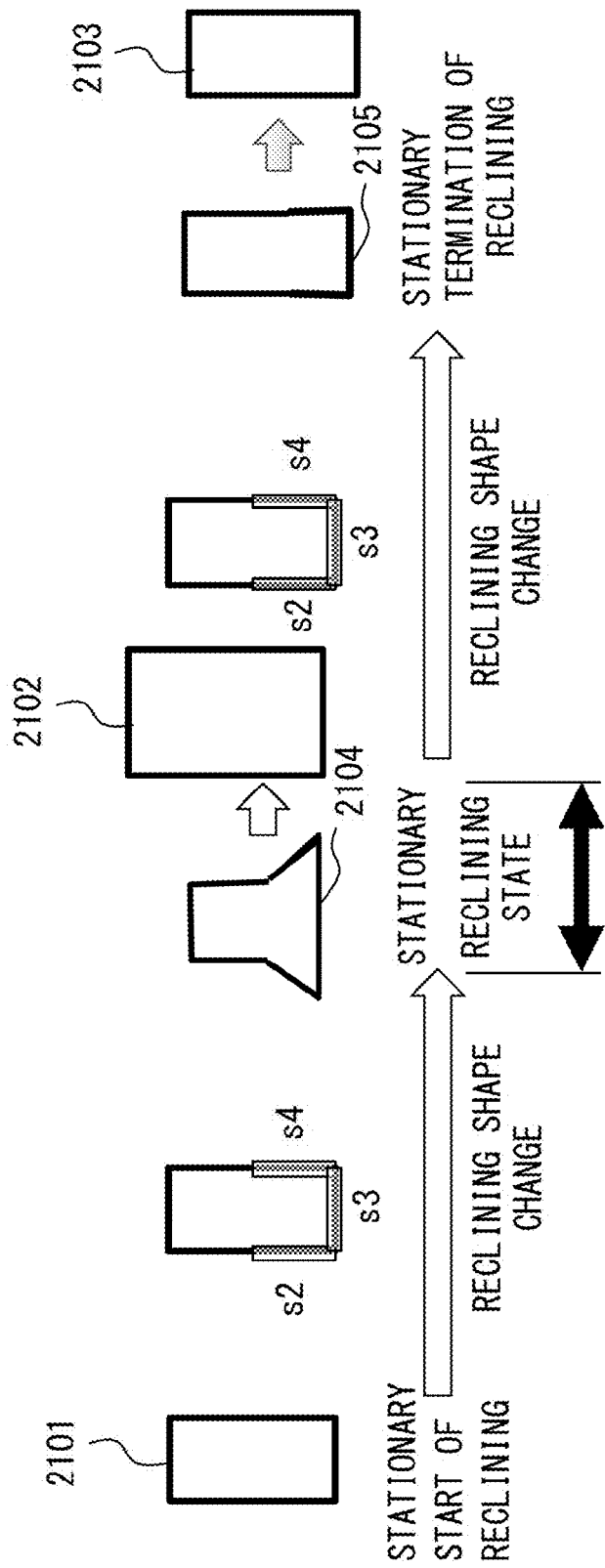
FIG. 21 illustrates a reclining shape change.

FIG. 21 illustrates an example of a reclining shape change. A rectangle 2101 represents the bed area 103 before a start of reclining of the bed 102. A rectangle 2102 represents the bed area 103 generated from a U shape 2104 when a reclining shape change to raise the reclining portion of the bed 102 is performed and the reclining portion becomes stationary in a reclining state. A rectangle 2103 represents the bed area 103 generated from a U shape 2105 when a reclining shape change to tilt back the reclining portion is performed and the reclining is terminated.

In this case, the three-dimensional coordinate system xyz and the rectangle 2103 upon terminating the reclining are identical to the three-dimensional coordinate system xyz and the rectangle 2101 upon starting the reclining. While performing a reclining shape change, only the boundary areas s2 to s4 corresponding to the reclining portion become moving areas, and the boundary areas s1, s5, and s6 remain stationary areas. Thus, when only the boundary areas s2 to s4 are changed from a stationary area to a moving area, it is possible to determine that a reclining shape change has been started.

The rectangle 2101 and the rectangle 2102 have different center positions and difference sizes, so the rectangle 2102 does not become coterminous with the rectangle 2101. On the other hand, the rectangle 2101 and the rectangle 2103 have the same center position, the same slope, and the same size, so the rectangle 2103 becomes coterminous with the rectangle 2101. Thus, if a reclining shape change is started and then the bed area 103 after the state change is compared with the bed area 103 before the start of reclining, it is possible to determine whether the bed area 103 has entered a reclining state or the reclining has been terminated.

First, the state change determination unit 611 checks whether the state change determination processing is in a state-change-determination waiting state (Step 1801). The state-change-determination waiting state indicates that a result of determining a state change has not been settled, and corresponds to one of two types of states, a determination waiting state A and a determination waiting state B, as described later.

When the state change determination processing is not in a state-change-determination waiting state (Step 1801, NO), the state change determination unit 611 checks whether all of the boundary areas are moving areas (Step 1807). When all of the boundary areas are moving areas (step 1807, YES), the state change determination unit 611 determines that the state change determination processing is in the determination waiting state A (Step 1808). The determination waiting state A indicates that a change in the surface height or a horizontal movement of the bed 102 is ongoing. Then, the image processing device 601 repeats the processes of and after Step 901 with respect to an image 811 at a subsequent time.

When one or more boundary areas are stationary areas (Step 1807, NO), the state change determination unit 611 checks whether all of the boundary areas corresponding to the reclining portion are moving areas (Step 1809). In the example of FIG. 17, the boundary areas corresponding to the reclining portion are the boundary areas s2 to s4.

When all of the boundary areas corresponding to the reclining portion are moving areas (Step 1809, YES), the state change determination unit 611 determines that the state change determination processing is in the determination waiting state B (Step 1810). The determination waiting state B indicates that the reclining shape change of the bed 102 is ongoing. Then, the image processing device 601 repeats the processes of and after Step 901 with respect to an image 811 at a subsequent time.

When one or more boundary areas corresponding to the reclining portion are stationary areas (Step 1809, NO), the state change determination unit 611 checks whether the bed 102 is in a reclining state (Step 1811). When the bed 102 is in a reclining state (Step 1811, YES), the state change determination unit 611 determines that the reclining state of the bed 102 is ongoing (Step 1812). On the other hand, when the bed 102 is not in a reclining state (Step 1811, NO), the state change determination unit 611 determines that a change in the state of the bed 102 has not occurred (Step 1813).

When the state change determination processing is in a state-change-determination waiting state (Step 1801, YES), the state change determination unit 611 checks whether each boundary area is a moving area (Step 1802). When one or more boundary areas are moving areas (Step 1802, YES), the state change determination unit 611 determines that the change in the state of the bed 102 is ongoing. Then, the image processing device 601 repeats the processes of and after Step 901 with respect to an image 811 at a subsequent time.

On the other hand, when all of the boundary areas are stationary areas (Step 1802, NO), the state change determination unit 611 determines that the change in the state of the bed 102 has been terminated, and checks whether the state change determination processing is in the determination waiting state A or B (Step 1803).

When the state change determination processing is in the determination waiting state A (Step 1803, YES), the state change determination unit 611 checks, while changing the surface height H of the bed 102, whether there exists a correspondence relationship between the bed areas 103 before and after the state change (Step 1804). When there exists a correspondence relationship between the bed areas 103 before and after the state change (Step 1804, YES), the state change determination unit 611 determines that the state change is a change in the surface height (Step 1805), and releases the determination waiting state A (Step 1806).

On the other hand, when there exists no correspondence relationship between the bed areas 103 before and after the state change (Step 1804, NO), the state change determination unit 611 determines that the state change is a horizontal movement (Step 1814), and releases the determination waiting state A (Step 1806).

When the state change determination processing is in the determination waiting state B (Step 1803, NO), the state change determination unit 611 checks, without changing the surface height H of the bed 102, whether there exists a correspondence relationship between the bed areas 103 before and after the state change (Step 1815). When there exists a correspondence relationship between the bed areas 103 before and after the state change (Step 1815, YES), the state change determination unit 611 determines that the state change is a reclining shape change for termination of reclining (Step 1816), and releases the determination waiting state B (Step 1806).

On the other hand, when there exists no correspondence relationship between the bed areas 103 before and after the state change (Step 1815, NO), the state change determination unit 611 determines that the bed 102 is in a reclining state (Step 1817), and releases the determination waiting state B (Step 1806).

As described above, if a plurality of boundary areas are arranged on the boundary of the bed area 103 and a combination of moving boundary areas is obtained, it is possible to determine a type of change in the state of the bed 102 accurately.

Figure 22:
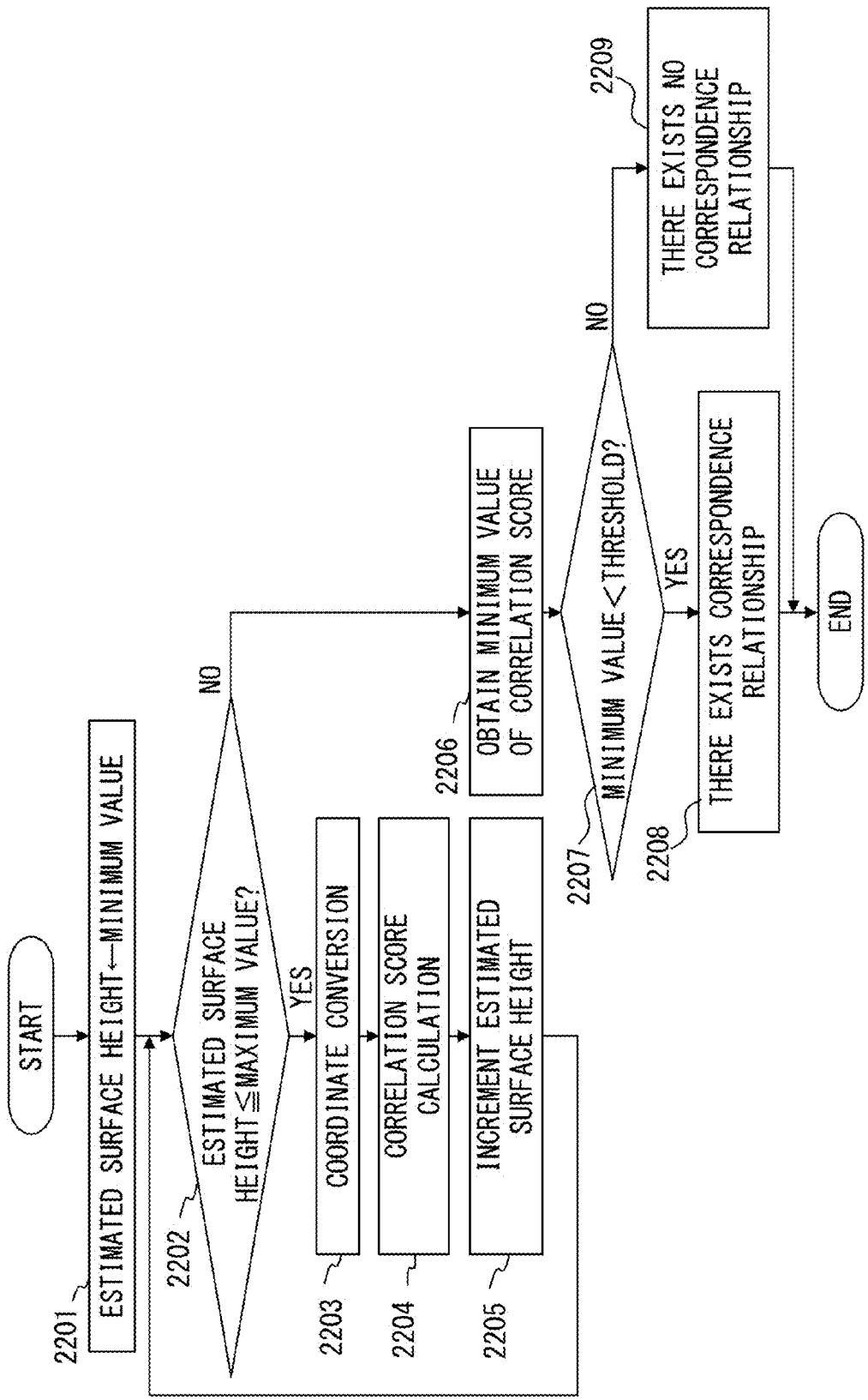
FIG. 22 is a flowchart of correspondence relationship determination processing when the surface height is changed.

FIG. 22 is a flowchart that illustrates an example of correspondence relationship determination processing in Step 1804 of FIG. 18. In the correspondence relationship determination processing of FIG. 22, while changing the surface height H of the bed 102 to change Zw, the state change determination unit 611 converts the U shape extracted in Step 1405 of FIG. 14 into the three-dimensional coordinate system xyz which corresponds to Zw after the change. Then, the state change determination unit 611 compares the converted U shape with the bed area 103 indicated by the bed area information 814, so as to determine whether there exists a correspondence relationship.

First, the state change determination unit 611 sets, to be an estimated surface height, a minimum value of the surface height in a range in which the surface height is changeable, the range being determined by the specification of the bed 102 (Step 2201), and compares the estimated surface height with a maximum value in the range in which the surface height is changeable (Step 2202).

When the estimated surface height is not greater than the maximum value (Step 2202, YES), the state change determination unit 611 determines Zw from the estimated surface height, and converts the U shape extracted in Step 1405 into the three-dimensional coordinate system xyz which corresponds to determined Zw (Step 2203). As a result, each line segment included in the U shape is converted into a new three-dimensional coordinate system xyz, and the position and the length of each line segment are changed. Next, the state change determination unit 611 calculates a correlation score between the changed U shape and the bed area 103 indicated by the bed area information 814 (Step 2204).

Figure 23:
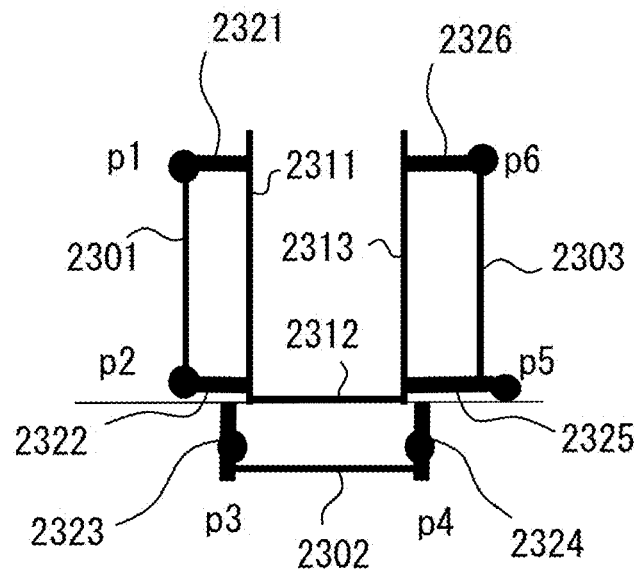
FIG. 23 illustrates a method for calculating a correlation score.

FIG. 23 illustrates an example of a method for calculating a correlation score. When line segments 2301 to 2303 are included in a U shape, a correlation score is calculated on the basis of a distance between each of the line segments and a corresponding boundary of the bed area 103.

A distance between an endpoint p1 of the line segment 2301 and a boundary 2311 of the bed area 103 corresponds to a length of a perpendicular 2321 dropped straight down from the endpoint p1 onto the boundary 2311, and a distance between an endpoint p2 and the boundary 2311 corresponds to a length of a perpendicular 2322 dropped straight down from the endpoint p2 onto the boundary 2311. Likewise, a distance between an endpoint p3 of the line segment 2302 and a boundary 2312 of the bed area 103, and a distance between an endpoint p4 of the line segment 2302 and the boundary 2312 correspond to a length of a perpendicular 2323 and a length of a perpendicular 2324, respectively. A distance between an endpoint p5 of the line segment 2303 and a boundary 2313 of the bed area 103, and a distance between an endpoint p6 of the line segment 2303 and the boundary 2313 correspond to a length of a perpendicular 2325 and a length of a perpendicular 2326, respectively.

A length L of a perpendicular dropped straight down from a point (x0,y0) in the xy plane onto a boundary represented by an equation ax+by+c=0 is obtained using the following formula.

$$L = |a \cdot x0 + b \cdot y0 + c| / (a^2 + b^2)^{1/2} \quad (21)$$

In this case, a sum of the lengths of the perpendiculars 2321 to 2326 can be used as a correlation score. If the U shape is closer to the shape of the bed area 103, the correlation score is smaller, and if the U shape is further from the shape of the bed area 103, the correlation score is larger.

Next, the state change determination unit 611 increments the estimated surface height by a prescribed increment (Step 2205), and repeats the processes of and after Step 2202. Then, when the estimated surface height is greater than the maximum value (Step 2202, NO), the state change determination unit 611 obtains a minimum value of the correlation score calculated in Step 2204 (Step 2206), and compares the minimum value of the correlation score with a threshold (Step 2207).

When the minimum value of the correlation score is less than the threshold (Step 2207, YES), the state change determination unit 611 determines that there exists a correspondence relationship between the bed areas 103 before and after the state change (Step 2208). On the other hand, when the minimum value of the correlation score is not less than the threshold (Step 2207, NO), the state change determination unit 611 determines that there exists no correspondence relationship between the bed areas 103 before and after the state change (Step 2209).

Figure 24:
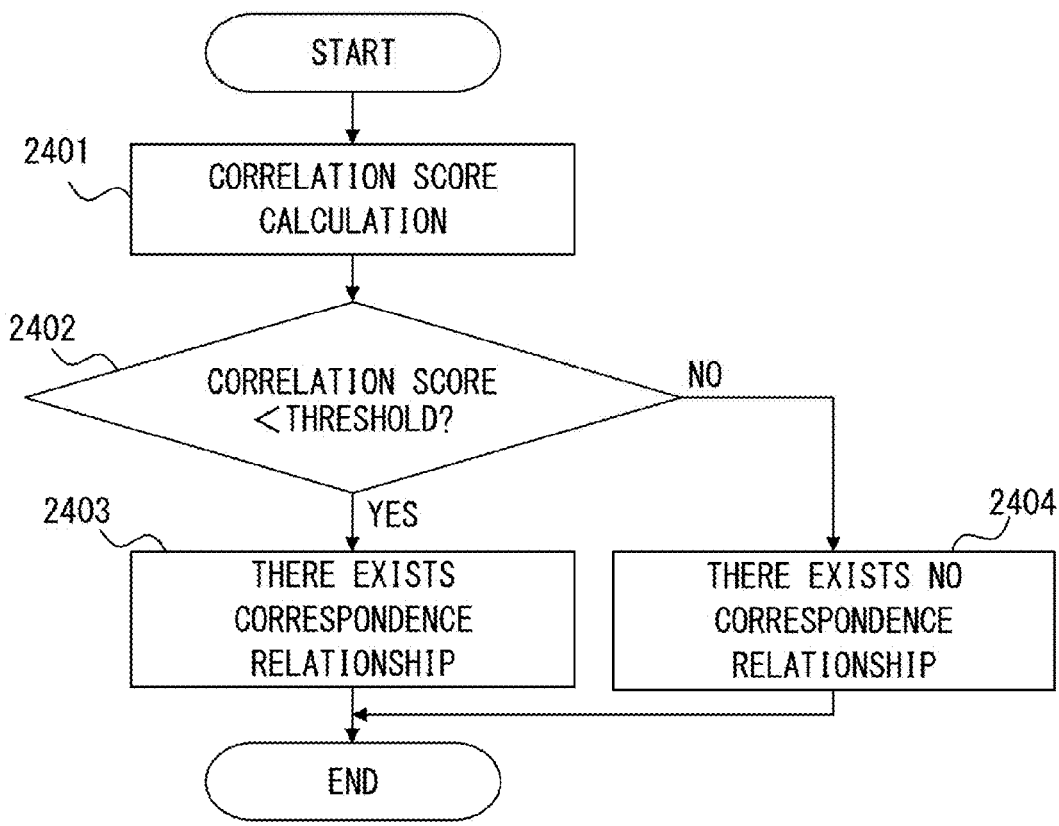
FIG. 24 is a flowchart of the correspondence relationship determination processing when the surface height is not changed.

FIG. 24 is a flowchart that illustrates an example of the correspondence relationship determination processing in Step 1815 of FIG. 18. In the correspondence relationship determination processing of FIG. 24, the state change determination unit 611 compares, without changing the surface height H of the bed 102, the U shape extracted in Step 1405 of FIG. 14 with the bed area 103 indicated by the bed area information 814, so as to determine whether there exists a correspondence relationship.

First, the state change determination unit 611 calculates a correlation score between the U shape extracted in Step 1405 and the bed area 103 indicated by the bed area information 814 (Step 2401), and compares the correlation score with the threshold (Step 2402).

When the correlation score is less than the threshold (Step 2402, YES), the state change determination unit 611 determines that there exists a correspondence relationship between the bed areas 103 before and after the state change (Step 2403). On the other hand, when the correlation score is not less than the threshold (Step 2402, NO), the state change determination unit 611 determines that there exists no correspondence relationship between the bed areas 103 before and after the state change (Step 2404).

After it performs the process of Step 1806, Step 1812, or Step 1813 of FIG. 18, the state change determination unit 611 checks whether a result of the determination performed in the state change determination processing indicates a horizontal movement (Step 1006). When the determination result indicates a horizontal movement (Step 1006, YES), the state change determination unit 611 terminates the processing.

On the other hand, when the determination result does not indicate a horizontal movement (Step 1006, NO), the state change determination unit 611 checks whether the determination result indicates a change in the surface height (Step 1007). When the determination result indicates a change in the surface height (Step 1007, YES), the state change determination unit 611 estimates the surface height of the bed 102 (Step 1008).

Figure 25:
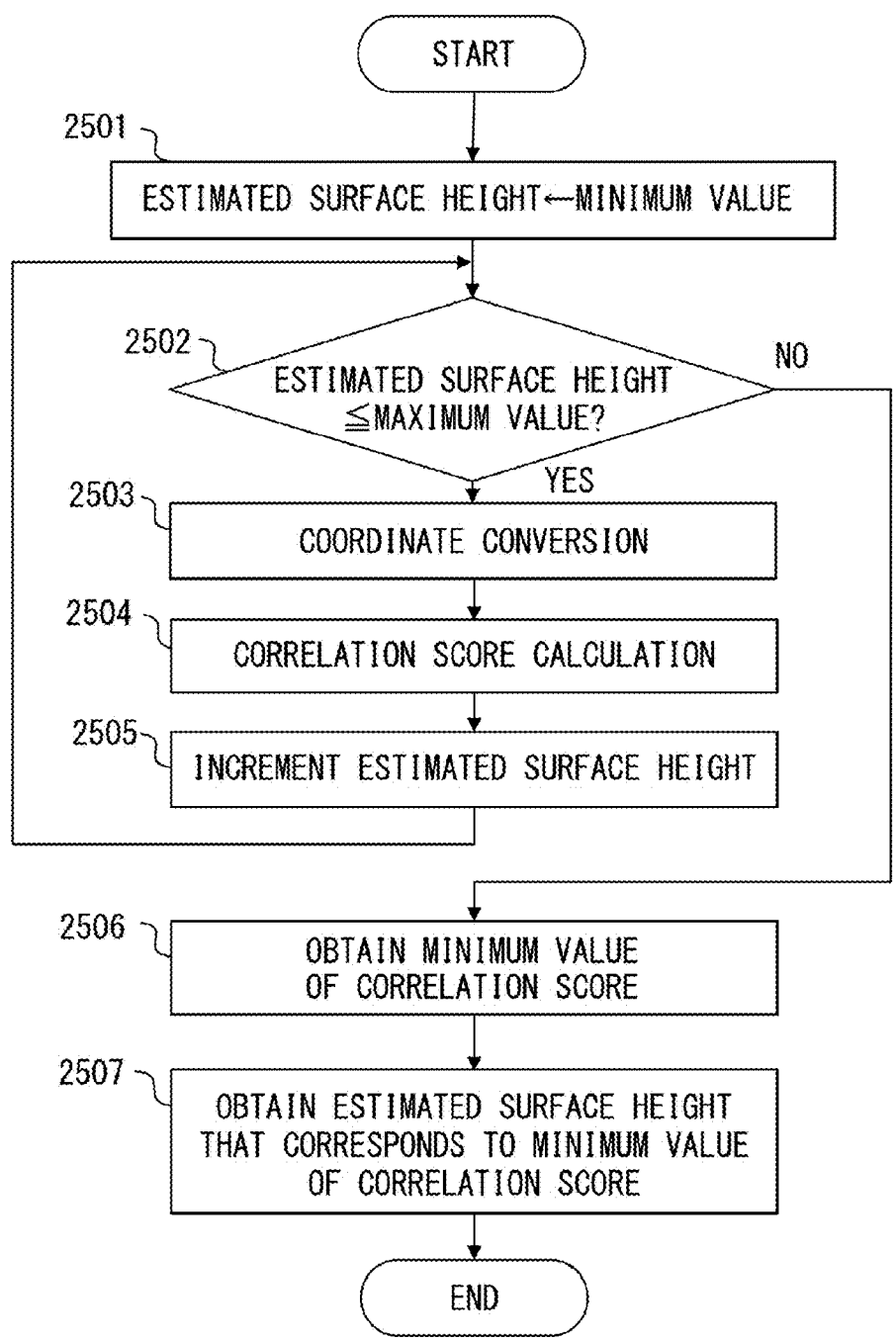
FIG. 25 is a flowchart of surface height estimation processing.

FIG. 25 is a flowchart that illustrates an example of the surface height estimation processing in Step 1008 of FIG. 10. The processes of Step 2501 to Step 2506 of FIG. 25 are similar to those of Step 2201 to Step 2206 of FIG. 22. After it obtains the minimum value of the correlation score, the state change determination unit 611 obtains, as an estimation result, the estimated surface height that corresponds to the minimum value of the correlation score (Step 2507).

FIGS. 26A to 26E illustrate examples of a U shape that changes according to an estimated surface height in the surface height estimation processing. If the estimated surface height is higher, the U shape is gradually made smaller, as illustrated in FIGS. 26A to 26E.

FIGS. 26A and 26B respectively illustrate U shapes 2601 and 2602 when the estimated surface height is lower than an actual surface height. In this case, the U shapes 2601 and 2602 are each situated outside a shape 2611 of the bed area 103.

FIG. 26C illustrates a U shape 2603 when the estimated surface height is consistent with the actual surface height. In this case, the U shape 2603 becomes coterminous with the shape 2611 of the bed area 103.

FIGS. 26D and 26E respectively illustrate U shapes 2604 and 2605 when the estimated surface height is higher than the actual surface height. In this case, the U shapes 2604 and 2605 are each situated inside the shape 2611 of the bed area 103.

FIG. 27 illustrates an example of a change in a correlation score in the surface height estimation processing. If the estimated surface height is incremented from the minimum value to the maximum value, the correlation score changes as represented by a curve 2701. In this case, the estimated surface height corresponding to the minimum value 2702 of the correlation score is obtained as an estimation result.

The state change determination unit 611 may use, as an estimation result, the estimated surface height corresponding to the minimum value of the correlation score that is obtained in Step 2206 of FIG. 22 instead of performing the surface height estimation processing of FIG. 25.

Next, the bed area estimation unit 802 determines Zw from the estimated surface height, and performs, on the basis of the determined Zw, a coordinate conversion similar to that performed in Step 1002 (Step 1009). Then, the bed area estimation unit 802 determines the bed area 103, as in the case in Step 1003 (Step 1010).

On the other hand, when the determination result does not indicate a change in the surface height (Step 1007, NO), the state change determination unit 611 checks whether the determination result indicates a reclining state (Step 1011). When the determination result indicates a reclining state (Step 1011, YES), the state change determination unit 611 determines that the bed area 103 before the start of reclining is to be used without any change (Step 1012). When the determination result does not indicate a reclining state (Step 1011, NO), that is, when the determination result indicates a termination of reclining or no state change, the state change determination unit 611 terminates the processing.

When the determination result indicates a horizontal movement (Step 1006, YES), the bed area estimation unit 802 updates, in Step 903 of FIG. 9, the bed area information 814 on the basis of the bed area 103 determined in Step 1003. As a result, a piece of bed area information 814 that indicates the bed area 103 after the horizontal movement is output in Step 904.

When the determination result indicates a change in the surface height (Step 1007, YES), the bed area estimation unit 802 updates, in Step 903, the bed area information 814 on the basis of the bed area 103 determined in Step 1010. As a result, a piece of bed area information 814 that indicates the bed area 103 after the change in the surface height is output in Step 904.

When the determination result indicates a reclining state, a termination of reclining, or no state change (Step 1007, NO), the bed area estimation unit 802 does not update, in Step 903, the bed area information 814. As a result, in Step 904, it is possible to output, from the start of reclining to the termination of reclining, a piece of bed area information 814 that indicates the bed area 103 before the start of reclining.

In Step 904, when an area is highlighted that corresponds to the bed area 103 in the image 811, the bed area estimation unit 802 reverse converts, into an area in the image 811, the bed area 103 in three-dimensional space that is indicated by the bed area information 814. Then, the output unit 612 highlights the reverse-converted area on a screen. At this point, the output unit 612 may surround the reverse-converted area with a box or may change a color for displaying the reverse converted area, so as to perform highlighting.

If such image processing is performed, it is possible to output proper information of the bed area 103 according to the type of state change even when a change in the surface height, a horizontal movement, or a reclining shape change of the bed 102 occurs.

Figure 28:
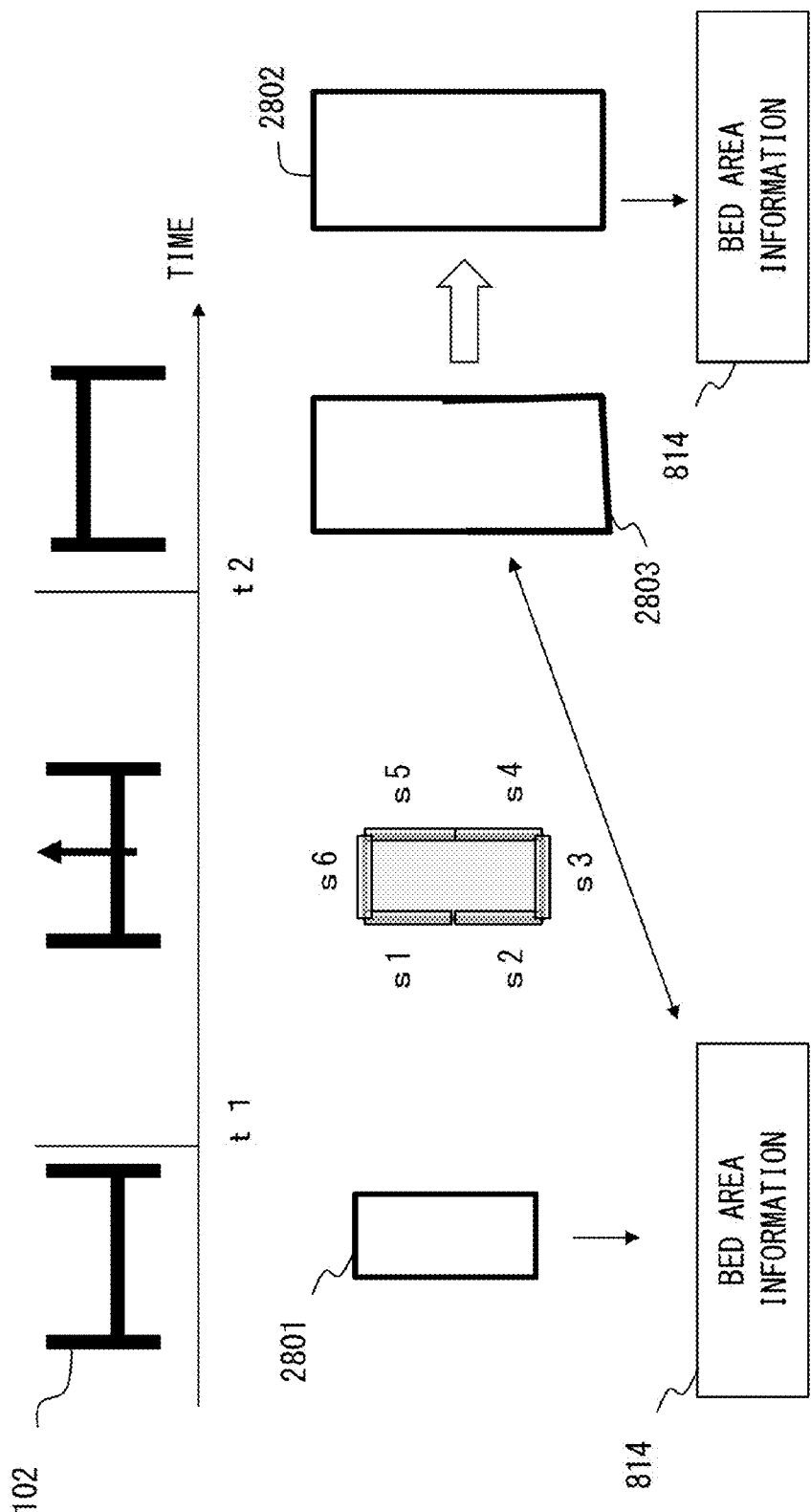
FIG. 28 illustrates the image processing due to a change in the surface height.

FIG. 28 illustrates an example of the image processing due to a change in the surface height. The raising of the surface height of the bed 102 is started at a time t1 and terminated at a time t2. A rectangle 2801 represents the bed area 103 before the change in the surface height, and a rectangle 2802 represents the bed area 103 generated from a U shape 2803 after the change in the surface height.

In a state before the time t1, the bed area information 814 indicates the rectangle 2801. When the raising of the surface height is started at the time t1, the boundary areas s1 to s6 become moving areas, so it is determined that a change in the surface height or a horizontal movement has occurred, and the state enters the determination waiting state A. While the raising of the surface height is ongoing during a time period from the time t1 to the time t2, the boundary areas s1 to s6 remain moving areas, so the determination waiting state A is not released. Thus, the bed area information 814 is not updated during the time period.

When the raising of the surface height is terminated at the time t2, the boundary areas s1 to s6 become stationary areas, so it is determined, while changing the estimated surface height, whether there exists a correspondence relationship between the U shape 2803 and the rectangle 2801 indicated by the bed area information 814. In this case, there exists a correspondence relationship between the U shape 2803 and the rectangle 2801, so the state change is determined to be a change in the surface height, and the determination waiting state A is released.

Next, the surface height after the change is estimated, and the rectangle 2802 that represents the bed area 103 is generated again from the U shape 2803 in the three-dimensional coordinate system xyz which corresponds to the estimated surface height. Then, the bed area information 814 is updated to information that indicates the generated rectangle 2802.

When a horizontal movement of the bed 102 has occurred instead of a change in the surface height, there exists no correspondence relationship between the U shape 2803 and the rectangle 2801 at the time t2, so the state change is determined to be a horizontal movement, and the determination waiting state A is released. In this case, the information about the surface height H is not updated, and the bed area information 814 is updated to information that indicates the bed area 103 after the movement.

FIG. 29 illustrates an example of the image processing due to a reclining shape change. In this example, a reclining shape change 2911 to raise the reclining portion of the bed 102 is started at a time t11 and terminated at a time t12. After that, a reclining shape change 2912 to tilt back the reclining portion of the bed 102 is started at a time t13 and terminated at a time t14. During a time period from the time t12 to the time t13, the bed 102 is in a reclining state. A rectangle 2901 represents the bed area 103 before the reclining shape change 2911 is started.

In a state before the time t11, the bed area information 814 indicates the rectangle 2901. When the reclining shape change 2911 is started at the time t11, the boundary areas s2 to s4 become moving areas, so it is determined that a reclining shape change has occurred, and the state enters the determination waiting state B. While the reclining shape change 2911 is ongoing during a time period from the time t11 to the time t12, the boundary areas s2 to s4 remain moving areas, so the determination waiting state B is not released.

When the reclining shape change 2911 is terminated at the time t12, the boundary areas s2 to s4 become stationary areas, so it is determined whether there exists a correspondence relationship between a U shape 2902 and the rectangle 2901 indicated by the bed area information 814. In this case, there exists no correspondence relationship between the U shape 2902 and the rectangle 2901, so the state is determined to be a reclining state, and the determination waiting state B is released.

When the reclining shape change 2912 is started at the time t13, the boundary areas s2 to s4 become moving areas again, so it is determined that a reclining shape change has occurred, and the state enters the determination waiting state B again. While the reclining shape change 2912 is ongoing during a time period from the time t13 to the time t14, the boundary areas s2 to s4 remain moving areas, so the determination waiting state B is not released.

When the reclining shape change 2912 is terminated at the time t14, the boundary areas s2 to s4 become stationary areas, so it is determined whether there exists a correspondence relationship between a U shape 2904 and the rectangle 2901. In this case, there exists a correspondence relationship between the U shape 2904 and the rectangle 2901, so it is determined that the reclining has been terminated, and the determination waiting state B is released. At this point, the shape of the bed area 103 returns to the rectangle 2901 before the reclining shape change 2911 is started, so the bed area information 814 is not updated.

Figure 30:
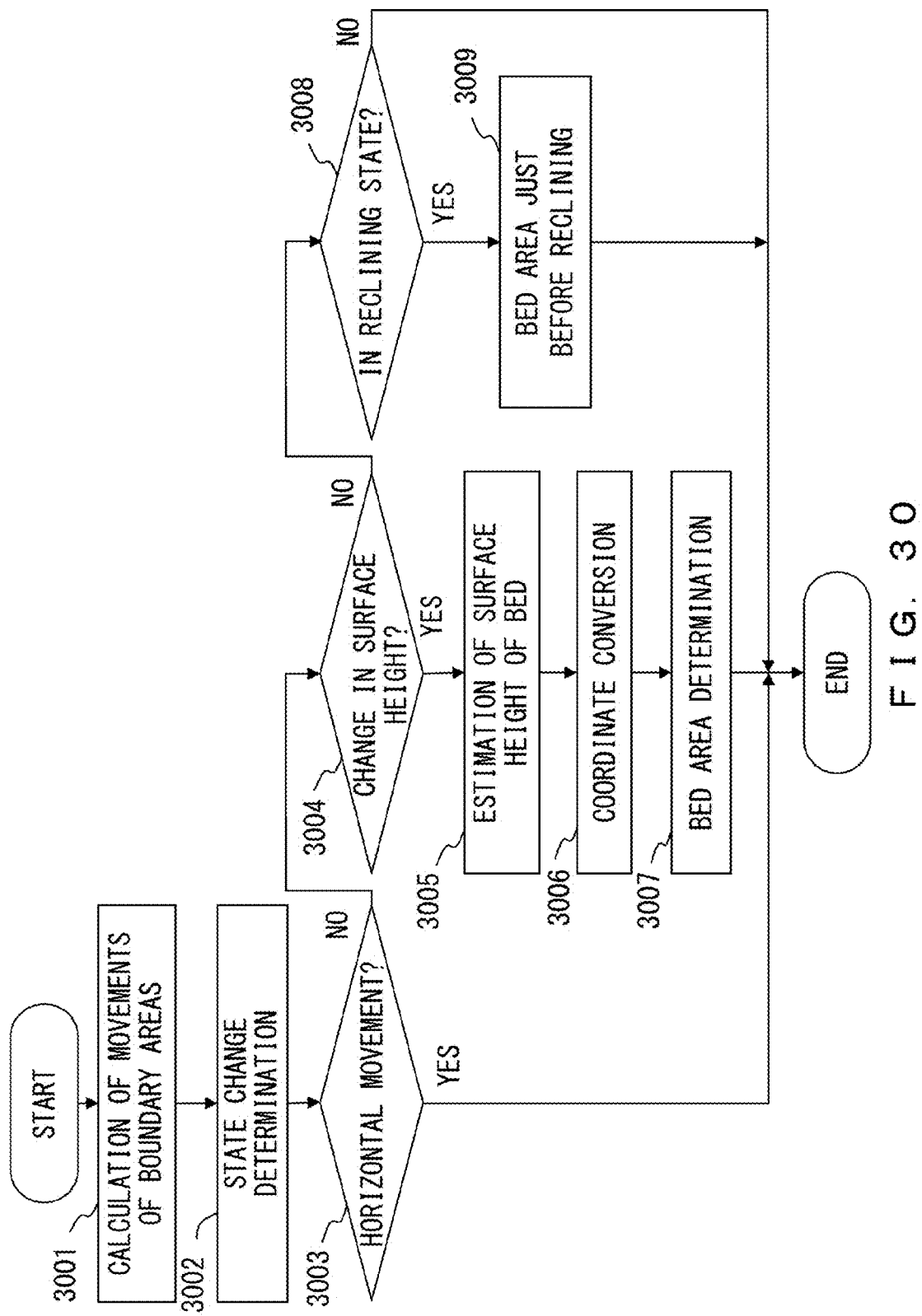
FIG. 30 is a flowchart that illustrates a second specific example of the bed area estimation processing.

FIG. 30 is a flowchart that illustrates a second specific example of the bed area estimation processing in Step 902 of FIG. 9. In the bed area estimation processing of FIG. 30, the processes of Step 1001 to Step 1003 of FIG. 10 are omitted, and these processes are performed in state change determination processing in Step 3002.

The processes of Step 3001 and Step 3003 to Step 3009 of FIG. 30 are similar to the processes of Step 1004 and Step 1006 to Step 1012 of FIG. 10. However, in Step 3001, the state change determination unit 611 calculates movements of a plurality of boundary areas on the basis of a most recent bed area 103 indicated by the bed area information 814.

Figure 31A:
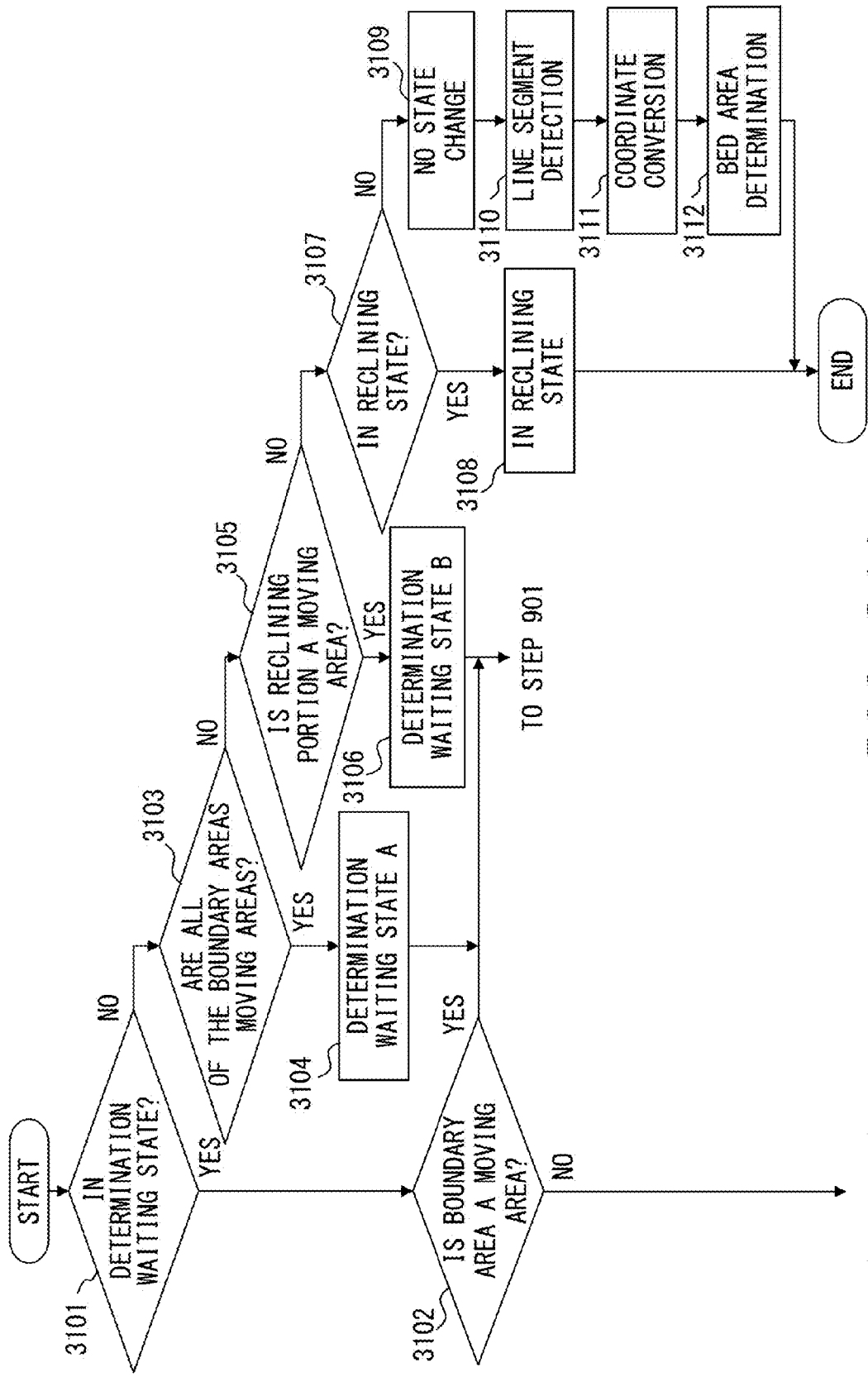
FIG. 31A is (part 1 of) a flowchart that illustrates a second specific example of the state change determination processing.
Figure 31B:
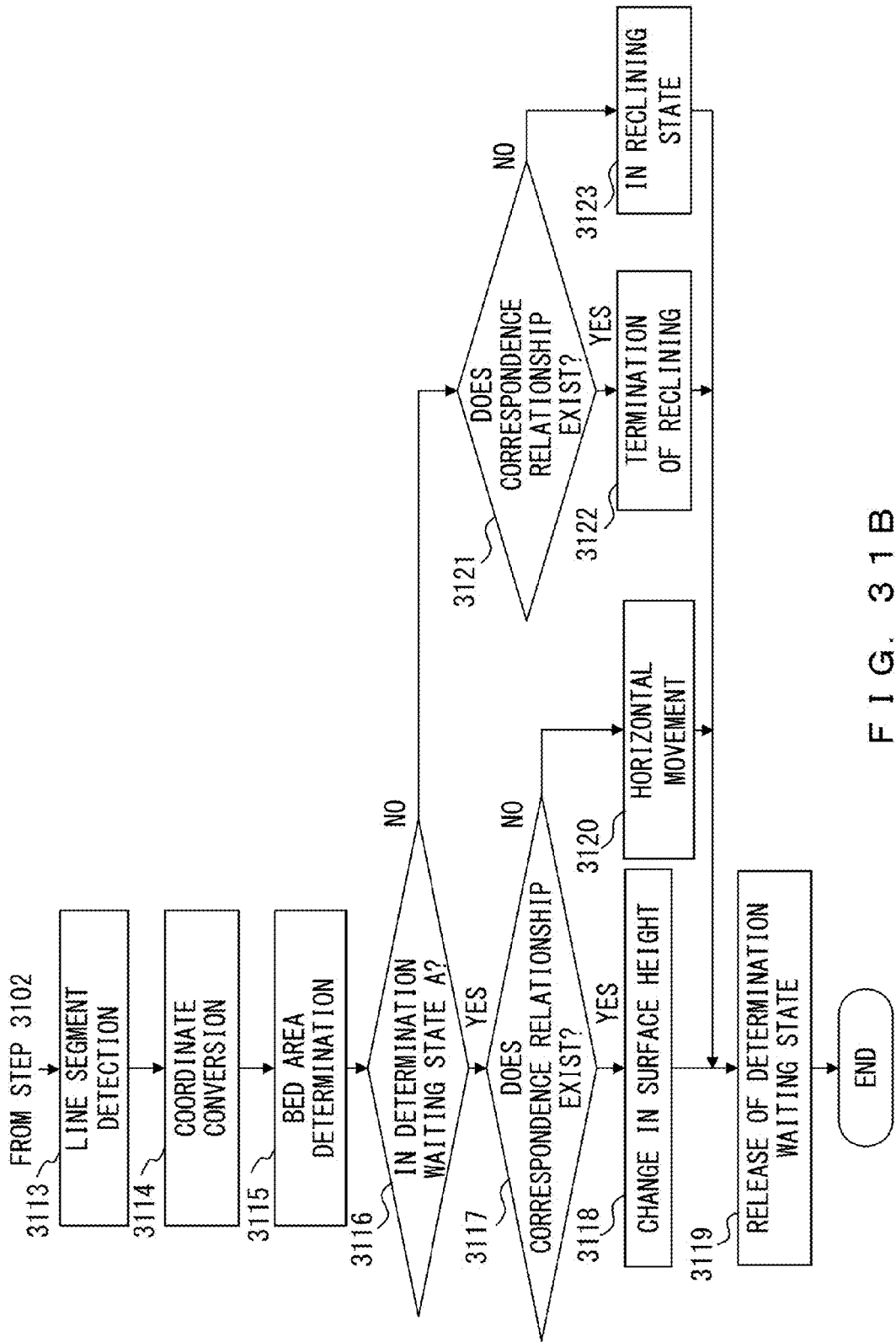
FIG. 31B is (part 2 of) a flowchart that illustrates the second specific example of the state change determination processing.

FIGS. 31A and 31B are a flowchart that illustrates an example of the state change determination processing in Step 3002 of FIG. 30. The processes of Step 3101 to Step 3109 of FIG. 31A are similar to those of Step 1801, Step 1802, and Step 1807 to Step 1813 of FIG. 18.

In Step 3109, when the state change determination unit 611 determines that there is no state change, the bed area estimation unit 802 generates line segments represented by edges detected from an input image 811 (Step 3110). Next, the bed area estimation unit 802 converts each line segment in the image 811 into a line segment in a three-dimensional coordinate system (Step 3111), and determines the bed area 103 in three-dimensional space (Step 3112). The processes of Step 3110 to Step 3112 are similar to those of Step 1001 to Step 1003 of FIG. 10.

In step 3102, when all of the boundary areas are stationary areas (Step 3102, NO), the bed area estimation unit 802 generates line segments represented by edges detected from an input image 811 (Step 3113). Next, the bed area estimation unit 802 converts each line segment in the image 811 into a line segment in a three-dimensional coordinate system (Step 3114), and determines the bed area 103 in three-dimensional space (Step 3115). The processes of Step 3113 to Step 3115 are similar to those of Step 1001 to Step 1003 of FIG. 10.

Next, the state change determination unit 611 performs the processes of and after Step 3116. The processes of Step 3116 to Step 3123 are similar to those of Step 1803 to Step 1806 and Step 1814 to Step 1817 of FIG. 18.

When the determination result indicates a horizontal movement (Step 3003, YES), the bed area estimation unit 802 updates, in Step 903 of FIG. 9, the bed area information 814 on the basis of the bed area 103 determined in Step 3115. As a result, a piece of bed area information 814 that indicates the bed area 103 after the horizontal movement is output in Step 904.

When the determination result indicates a change in the surface height (Step 3004, YES), the bed area estimation unit 802 updates, in Step 903, the bed area information 814 on the basis of the bed area 103 determined in Step 3007. As a result, a piece of bed area information 814 that indicates the bed area 103 after the change in the surface height is output in Step 904.

When the determination result indicates no state change, the bed area estimation unit 802 updates, in Step 903, the bed area information 814 on the basis of the bed area 103 determined in Step 3112. As a result, a piece of bed area information 814 that indicates the newest bed area 103 is output in Step 904.

When the determination result indicates a reclining state or a termination of reclining, the bed area estimation unit 802 does not update, in Step 903, the bed area information 814. As a result, in Step 904, it is possible to output, from the start of reclining to the termination of reclining, a piece of bed area information 814 that indicates the bed area 103 before the start of reclining.

In the bed area estimation processing of FIG. 10, even when the change in the state of the bed 102 is ongoing, the processes of a line segment detection, a coordinate conversion, and abed area determination are performed in Step 1001 to Step 1003.

On the other hand, in the state change determination processing of FIGS. 31A and 31B, when one or more boundary areas are moving areas in the determination waiting state A or B (Step 3102, YES), the processes of Step 3113 to Step 3115 are not performed. Thus, when the change in the state of the bed 102 is ongoing, the processes of a line segment detection, a coordinate conversion, and a bed area determination are skipped. As a result, in the bed area estimation processing of FIG. 30, a load placed on the bed area estimation unit 802 is reduced relative to the bed area estimation processing of FIG. 10.

In Step 3109 of FIG. 31A, when the state change determination unit 611 determines that there is no state change, the bed area estimation unit 802 may omit the processes of Step 3110 to Step 3112.

In Step 1003 and Step 1010 of FIG. 10, Step 3007 of FIG. 30, Step 3112 of FIG. 31A, and Step 3115 of FIG. 31B, it is also possible to determine the bed area 103 by a method other than the bed area determination processing of FIG. 14. For example, a U shape may be directly generated by combining three line segments, instead of generating an L shape by combining two line segments.

Figure 32:
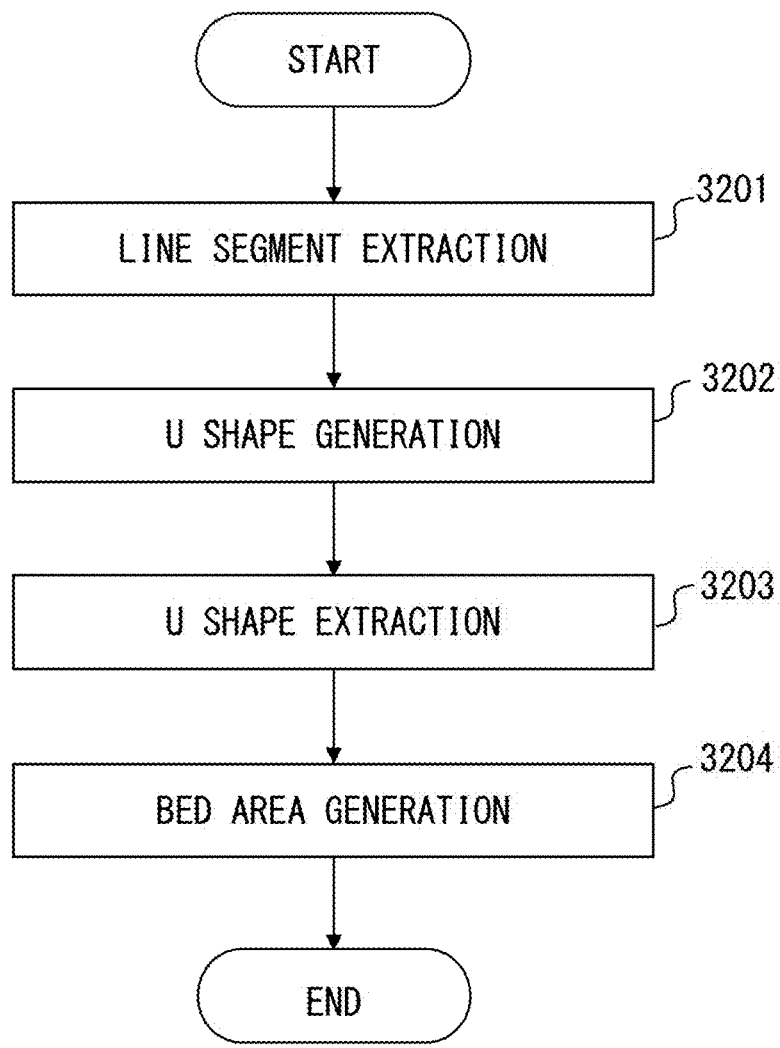
FIG. 32 is a flowchart that illustrates a second specific example of the bed area determination processing.

FIG. 32 is a flowchart that illustrates a second specific example of the bed area determination processing described above. First, the bed area estimation unit 802 extracts, from among line segments in the three-dimensional coordinate system xyz, a line segment that satisfies the line extraction condition (Step 3201). Next, the bed area estimation unit 802 combines three line segments so as to generate a U shape (Step 3202), and extracts, from generated U shapes, a U shape that satisfies the U shape extraction condition (Step 3203). Then, the bed area estimation unit 802 generates, from extracted U shapes, a shape that represents the bed area 103 (Step 3204).

The configurations of the image processing device 601 of FIGS. 6 and 8 are merely examples, and some of the components may be omitted or changed according to the applications or the requirements of the image processing device 601. For example, in the image processing device 601 of FIG. 8, when the processing of estimating the bed area 103 from the image 811 is performed outside the image processing device 601, the bed area estimation unit 802 may be omitted. When the lens distortion of the camera 101 is low, the lens distortion information 813 can be omitted.

The flowcharts of FIGS. 7, 9, 10, 14, 18, 22, 24, 25, and 30 to 32 are merely examples and some of the processes may be omitted or changed according to the configurations or the requirements of the image processing device 601. For example, when the bed area information 814 is not output in the image processing of FIG. 9, the process of Step 904 can be omitted.

The processes of Step 1011 and Step 1012 of FIG. 10 can be omitted when a reclining shape change is not included in a determination target of the state change determination processing in Step 1005. In this case, Step 1803, Step 1809 to Step 1812, and Step 1815 to Step 1817 of FIG. 18 can also be omitted. Then, the state change determination unit 611 performs the process of Step 1813 when one or more boundary areas are stationary areas in Step 1807.

The processes of Step 1006 to Step 1010 of FIG. 10 can be omitted when a change in the surface height and a horizontal movement are not included in the determination target of the state change determination processing in Step 1005. In this case, Step 1803 to Step 1805, Step 1807, Step 1808, and Step 1814 of FIG. 18 can also be omitted.

Then, the state change determination unit 611 performs the processes of and after Step 1809 when the state change determination processing is not in a state-change-determination waiting state in Step 1801, and performs the processes of and after Step 1815 when all of the boundary areas are stationary areas in Step 1802. Further, the state change determination unit 611 performs the processes of and after Step 1011 after it performs the process of Step 1806, Step 1812, or Step 1813.

The processes of Step 3008 and Step 3009 of FIG. 30 can be omitted when a reclining shape change is not included in the determination target of the state change determination processing in Step 3002. In this case, Step 3105 to Step 3108 of FIG. 31A, and Step 3116 and Step 3121 to Step 3123 of FIG. 31B can also be omitted. Then, the state change determination unit 611 performs the processes of and after Step 3109 when one or more boundary areas are stationary areas in Step 3103.

The processes of Step 3003 to Step 3007 of FIG. 30 can be omitted when a change in the surface height and a horizontal movement are not included in the determination target of the state change determination processing in Step 3002. In this case, Step 3103 and Step 3104 of FIG. 31A, and Step 3116 to Step 3118 and Step 3120 of FIG. 31B can also be omitted.

Then, the state change determination unit 611 performs the processes of and after Step 3105 when the state change determination processing is not in a state-change-determination waiting state in Step 3101, and performs the processes of and after Step 3121 after it performs the process of Step 3115. Further, the state change determination unit 611 performs the processes of and after Step 3008 after the process of Step 3108, Step 3112, or Step 3119.

In Step 1401 of FIG. 14 and Step 3201 of FIG. 32, the bed area estimation unit 802 may extract, from line segments included in the same plane as the surface 502 of the bed 102, a line segment that satisfies the line segment extraction condition. For example, when the three-dimensional coordinate system xyz of FIG. 12 is used, a line segment that satisfies the line segment extraction condition is extracted from line segments included in the xy plane.

The arrangement of the camera 101 of FIG. 1 is merely an example, and the camera 101 may be arranged in another position. Further, the shape of the bed 102 is merely an example, and a bed 102 having another shape may be used. The camera coordinate system xcyczc and the three-dimensional coordinate system xyz of FIGS. 11 to 13 are merely examples, and other camera coordinate system and three-dimensional coordinate system may be used. For example, the origin of the three-dimensional coordinate system xyz can be fixed on the floor 1103 of the room as illustrated in FIG. 11. Xw, Yx, and the yaw angle γ do not always have to be zero.

The bed area generation processing of FIGS. 15 and 16 is merely an example, and the shape of the bed area 103 may be generated by another method. For example, when a line segment is detected from the short side 1501 of the bed area 103, the shape of the bed area 103 can be generated by combining the U shape 1511 and the U shape 1512. The boundary areas s1 to s6 of FIG. 17 are merely examples, and boundary areas having other shapes may be used. The number of boundary areas is not limited to six, and it is sufficient if it is two or more.

The changes in the state of the bed 102 of FIGS. 19 to 21, 28, and 29 are merely examples, and other state changes may be included in the determination target. For example, when the portion of the feet side of bed 102 is raised and tilted back, instead of the portion of the head side, due to a reclining shape change, the reclining shape change in the portion of the feet side can be included in the determination target.

The method for calculating a correlation score in FIG. 23 is merely an example, and a correlation score may be calculated by another method. For example, when a line segment is detected from the short side 1501 of FIG. 15, a correlation score can be calculated on the basis of a distance between each line segment that is included in both of the U shapes 1511 and 1512, and a corresponding boundary of the bed area 103. The surface height estimation processing of FIGS. 26 and 27 is merely an example, and the surface height of the bed 102 may be estimated by another method. Formula (1) to Formula (21) are merely examples, and other formulations may be used.

Figure 33:
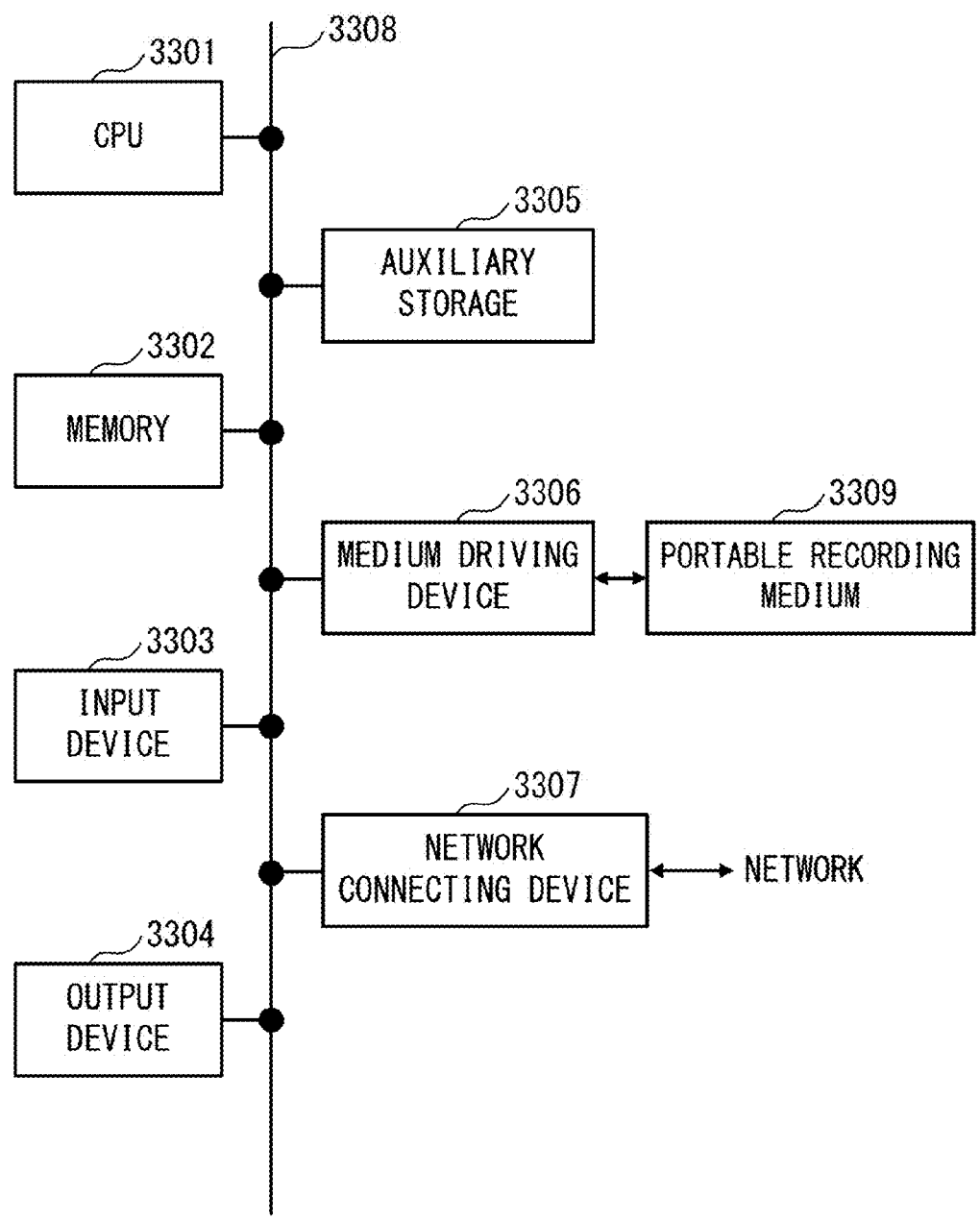
FIG. 33 illustrates a configuration of an information processing device.

The image processing device 601 of FIGS. 6 and 8 can be realized by, for example, an information processing device (a computer) illustrated in FIG. 33. The information processing device of FIG. 33 includes a central processing unit (CPU) 3301, a memory 3302, an input device 3303, an output device 3304, an auxiliary storage 3305, a medium driving device 3306, and a network connecting device 3307. These components are connected to one another via a bus 3308. The camera 101 of FIG. 8 may be connected to the network connecting device 3307 through a communication network.

The memory 3302 is, for example, a semiconductor memory such as a read only memory (ROM), a random access memory (RAM), and a flash memory, and stores therein a program and data used for performing the image processing. The memory 3302 can be used as the storage 803 of FIG. 8.

For example, the CPU 3301 (processor) operates as the state change determination unit 611 of FIGS. 6 and 8, the image obtaining unit 801, and the bed area estimation unit 802 by executing the program by use of the memory 3302.

The input device 3303 is, for example, a keyboard or a pointing device, and is used for inputting instructions or information from an operator or a user. The output device 3304 is, for example, a display, a printer, or a speaker, and is used for outputting inquiries to the operator or the user or for outputting a result of processing. The result of processing may be information that indicates a type of change in the state of the bed 102, the bed area information 814 that indicates the bed area 103, or an image in which the bed area 103 is highlighted. The output device 3304 can be used as the output unit 612 of FIGS. 6 and 8.

The auxiliary storage 3305 is, for example, a magnetic disk device, an optical disk device, a magneto-optical disk device, or a tape device. The auxiliary storage 3305 may be a hard disk drive. The information processing device stores the program and the data in the auxiliary storage 3305 so as to load them into the memory 3302 and use them. The auxiliary storage 3305 can be used as the storage 803 of FIG. 8.

The medium driving device 3306 drives a portable recording medium 3309 so as to access the recorded content. The portable recording medium 3309 is, for example, a memory device, a flexible disk, an optical disc, or a magneto-optical disk. The portable recording medium 3309 may be, for example, a compact disk read only memory (CD-ROM), a digital versatile disk (DVD), or a universal serial bus (USB) memory. The operator or the user can store the program and the data in the portable recording medium 3309 so as to load them into the memory 3302 and use them.

As described above, a computer-readable recording medium that stores therein a program and data used for the image processing is a physical (non-transitory) recording medium such as the memory 3302, the auxiliary storage 3305, and the portable storage medium 3309.

The network connecting device 3307 is a communication interface that is connected to a communication network such as a local area network or a wide area network and makes a data conversion associated with communication. The information processing device can receive the program and the data from an external device via the network connecting device 3307 so as to load them into the memory 3302 and use them. The network connecting device 3307 can be used as the output unit 612 of FIGS. 6 and 8. The information processing device can also receive a processing request from a user terminal, perform the image processing, and transmit a result of processing to the user terminal via the network connecting device 3307.

The information processing device does not necessarily include all of the components in FIG. 33, and some of the components can be omitted according to the applications or the requirements. For example, when the instructions or the information from the operator or the user are not to be input, the input device 3303 may be omitted. When the inquiries to the operator or the user or the result of processing are not to be output, the output device 3304 may be omitted. When the portable recording medium 3309 or the communication network is not used, the medium driving device 3306 or the network connecting device 3307 may be omitted.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable recording medium having stored therein an image processing program causing a computer to execute a process comprising
determining a type of change in a state of a bed during a time period from capturing of a first image to capturing of a second image after the capturing of the first image, on the basis of a correspondence relationship between a boundary that indicates a first bed area in the first image and a line segment represented by an edge detected from the second image.

2. The non-transitory computer-readable recording medium according to claim 1, wherein
the determining the type of change in the state obtains a combination of moving boundary areas from among a plurality of boundary areas corresponding to a plurality of boundaries that indicate a second bed area in a third image captured during the time period, so as to determine the type of change in the state on the basis of the combination of boundary areas and the correspondence relationship.

3. The non-transitory computer-readable recording medium according to claim 2, wherein
the determining the type of change in the state changes a position and a length of the line segment by changing an estimated surface height of the bed in the second image, and compares the boundary that indicates the first bed area with the line segment after change, so as to determine the type of change in the state on the basis of a result of a comparison.

4. The non-transitory computer-readable recording medium according to claim 3, wherein
when the combination of the moving boundary areas represents the plurality of boundary areas and when the boundary that indicates the first bed area corresponds to the line segment after the change by setting the estimated surface height to a value in a range in which a surface height is changeable, the determining the type of change in the state determines that the type of change in the state is a change in a surface height of the bed.

5. The non-transitory computer-readable recording medium according to claim 4, wherein the process further comprises:

estimating a bed area in the second image when the type of change in the state is the change in the surface height; and outputting information about the estimated bed area.

6. The non-transitory computer-readable recording medium according to claim 3, wherein when the combination of boundary areas represents the plurality of boundary areas and when the boundary that indicates the first bed area does not correspond to the line segment even after setting the estimated surface height to any value in a range in which a surface height is changeable, the determining the type of change in the state determines that the type of change in the state is a horizontal movement of the bed.

7. The non-transitory computer-readable recording medium according to claim 6, wherein the process further comprises outputting information about a bed area estimated from the second image by use of the estimated surface height of the bed in the first image when the type of change in the state is the horizontal movement.

8. The non-transitory computer-readable recording medium according to claim 2, wherein when the combination of boundary areas represents a combination of some of the plurality of boundary areas and when the boundary that indicates the first bed area corresponds to the line segment, the determining the type of change in the state determines that the type of change in the state is a reclining shape change of the bed.

9. The non-transitory computer-readable recording medium according to claim 8, wherein the process further comprises outputting information about the first bed area as information about a bed area in the second image when the type of change in the state is the reclining shape change.

10. An image processing device comprising:

a processor configured to determine a type of change in a state of a bed during a time period from capturing of a first image to capturing of a second image after the capturing of the first image, on the basis of a correspondence relationship between a boundary that indicates a first bed area in the first image and a line segment represented by an edge detected from the second image; and an output interface configured to output information based on the type of change in the state.

11. The image processing device according to claim 10, wherein the processor obtains a combination of moving boundary areas from among a plurality of boundary areas corresponding to a plurality of boundaries that indicate a second bed area in a third image captured during the time period, so as to determine the type of change in the state on the basis of the combination of boundary areas and the correspondence relationship.

12. The image processing device according to claim 11, wherein the processor changes a position and a length of the line segment by changing an estimated surface height of the bed in the second image, and compares the boundary that indicates the first bed area with the line segment after change, so as to determine the type of change in the state on the basis of a result of a comparison.

13. An image processing method comprising determining, by a processor, a type of change in a state of a bed during a time period from capturing of a first image to capturing of a second image after the capturing of the first image, on the basis of a correspondence relationship between a boundary that indicates a first bed area in the first image and a line segment represented by an edge detected from the second image.

14. The image processing method according to claim 13, wherein the determining the type of change in the state obtains a combination of moving boundary areas from among a plurality of boundary areas corresponding to a plurality of boundaries that indicate a second bed area in a third image captured during the time period, so as to determine the type of change in the state on the basis of the combination of boundary areas and the correspondence relationship.

15. The image processing method according to claim 14, wherein the determining the type of change in the state changes a position and a length of the line segment by changing an estimated surface height of the bed in the second image, and compares the boundary that indicates the first bed area with the line segment after change, so as to determine the type of change in the state on the basis of a result of a comparison.

* * * * *